(12) United States Patent
Yang et al.

(10) Patent No.: US 12,454,050 B2
(45) Date of Patent: Oct. 28, 2025

(54) REACTIVE INTERACTIONS FOR ROBOTIC APPLICATIONS AND OTHER AUTOMATED SYSTEMS

(71) Applicant: Nvidia Corporation, Santa Clara, CA (US)

(72) Inventors: Wei Yang, Seattle, WA (US); Balakumar Sundaralingam, Seattle, WA (US); Christopher Jason Paxton, Pittsburgh, PA (US); Maya Cakmak, Seattle, WA (US); Yu-Wei Chao, Redmond, WA (US); Dieter Fox, Seattle, WA (US); Iretiayo Akinola, Gig Harbor, WA (US)

(73) Assignee: Nvidia Corporation, Santa Clara, CA (US)

( * ) Notice: Subject to any disclaimer, the term of this patent is extended or adjusted under 35 U.S.C. 154(b) by 713 days.

(21) Appl. No.: 17/854,730

(22) Filed: Jun. 30, 2022

(65) Prior Publication Data

US 2023/0294277 A1 Sep. 21, 2023

Related U.S. Application Data

(60) Provisional application No. 63/321,755, filed on Mar. 20, 2022.

(51) Int. Cl.
*B25J 9/16* (2006.01)
*G05B 19/4155* (2006.01)

(52) U.S. Cl.
CPC .......... *B25J 9/1612* (2013.01); *B25J 9/1605* (2013.01); *B25J 9/1666* (2013.01);
(Continued)

(58) Field of Classification Search
CPC ... B25J 9/1612; B25J 9/1666; G05B 19/4155; G05B 2219/40269; G05B 2219/50391
See application file for complete search history.

(56) References Cited

U.S. PATENT DOCUMENTS 9,321,176 B1 * 4/2016 Sun ................... B25J 15/0028
10,471,591 B1 * 11/2019 Hinkle .................. B25J 9/1612
(Continued)

FOREIGN PATENT DOCUMENTS

DE   102018220569 A1   6/2020
KR   20170138907 A    12/2017

OTHER PUBLICATIONS

Non-Final Office Action issued in U.S. Appl. No. 18/148,548, mailed Dec. 27, 2024.
(Continued)

*Primary Examiner* — Kyle O Logan
(74) *Attorney, Agent, or Firm* — Hogan Lovells US LLP

(57) ABSTRACT

Approaches presented herein provide for predictive control of a robot or automated assembly in performing a specific task. A task to be performed may depend on the location and orientation of the robot performing that task. A predictive control system can determine a state of a physical environment at each of a series of time steps, and can select an appropriate location and orientation at each of those time steps. At individual time steps, an optimization process can determine a sequence of future motions or accelerations to be taken that comply with one or more constraints on that motion. For example, at individual time steps, a respective action in the sequence may be performed, then another motion sequence predicted for a next time step, which can help drive robot motion based upon predicted future motion and allow for quick reactions.

20 Claims, 18 Drawing Sheets

(52) U.S. Cl.
CPC ............... *G05B 19/4155* (2013.01); *G05B 2219/40269* (2013.01); *G05B 2219/50391* (2013.01)

(56) References Cited

U.S. PATENT DOCUMENTS

| | | | |
|---|---|---|---|
| 10,913,151 B1 | 2/2021 | Hinkle | |
| 2012/0165979 A1 | 6/2012 | Lim et al. | |
| 2016/0257000 A1* | 9/2016 | Guerin | B25J 9/1671 |
| 2018/0319015 A1* | 11/2018 | Sinyavskiy | G05D 1/0088 |
| 2022/0032454 A1 | 2/2022 | Yang et al. | |
| 2023/0294277 A1* | 9/2023 | Yang | G05B 19/4155 |
| | | | 700/217 |

OTHER PUBLICATIONS

Notice of Allowance issued in U.S. Appl. No. 18/148,548, mailed Apr. 24, 2025.

\* cited by examiner

REACTIVE INTERACTIONS FOR ROBOTIC APPLICATIONS AND OTHER AUTOMATED SYSTEMS

CROSS-REFERENCE TO RELATED APPLICATIONS

This application claims priority to U.S. Provisional No. 63/321,755, filed Mar. 20, 2022, and entitled "Reactive Handovers with Fast Joint-Space Model-Predictive Behavior," which is hereby incorporated herein in its entirety and for all purposes.

BACKGROUND

Robots and other automated devices are increasingly being used to assist in the performance of various tasks. At least some of these tasks involve interacting with a human or other entity, such as to perform a handover action where the robot is to grasp and take an object from the hand of a person. For such an action, it is important that the robot grasp the object in such a way so as to not pinch or otherwise contact the human or entity from which the object is to be taken. In existing systems, the motion of a robot when performing such a task may not be smooth, intuitive, or reliable, which may result in a human making a quick or unexpected movement. Such movements may increase a likelihood of contact with a robot, or may cause the human hand during this movement to obstruct a camera used to provide a robot with a view of the environment, among other such undesirable actions.

BRIEF DESCRIPTION OF THE DRAWINGS

Various embodiments in accordance with the present disclosure will be described with reference to the drawings, in which.

DETAILED DESCRIPTION

Figure 1A:
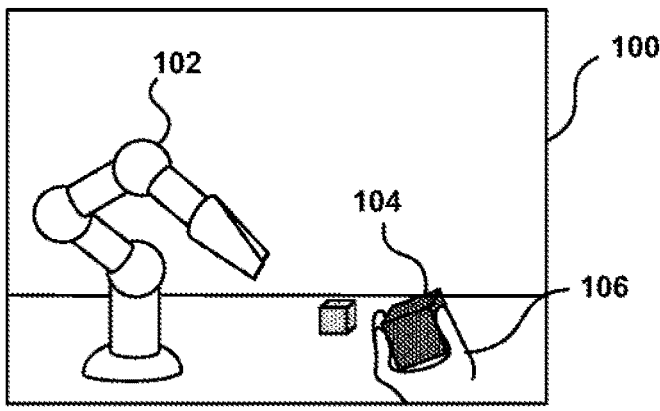
FIGS. 1A, 1B, 1C, and 1D illustrate images of a robot performing a handover operation, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Approaches in accordance with various embodiments can provide for optimized path planning for automated and partially automated devices and systems, such as an object handover between a human and a robot. Information (e.g., image or sensor data) about an environment can be obtained that can be used to determine a set of options for which a robot can perform a task, such as a set of potential grasp options with which a robot can grasp an object from a human hand. The set of potential grasps, as well as current state information for the robot and a set of constraints for the handover (or other action to be performed), can be fed to a path planning and optimization process. Such a process can attempt to determine, based at least in part upon current robot and environmental state information, motions (e.g., accelerations) to take over a number of future time steps—such as the next 10-15 time steps—or a path of motion over a future period of time. Such a planning process can also attempt to optimize the path or sequence of motions to attempt to minimize one or more cost factors or functions, while complying with one or more constraints on the motion, which may include general constraints (e.g., favor straight line motion, limit acceleration rates or changes, avoid collisions (such as with an object or human hand), and avoid camera occlusions) as well as constraints that may be specific to a particular task. Multiple potential grasp options and optimization determinations can be made for each individual time step, but only a first action (or first subset of actions) from a determined sequence of motions or accelerations might be performed for that time step, as the other motions or accelerations in a predicted sequence can instead be used to attempt to improve aspects such as a smoothness of motion based on anticipated future motions. Such optimization can be performed using a model predictive control (MPC) system, or other such predictive or optimization framework. During optimization, an MPC may determine, select, or modify the optimal or suitable grasp option based on current state information—e.g., at each time step. Contact detection can be used to allow the robot to know when to close the gripper or otherwise grasp the target object (or perform a specific action), which might be at a different location than was expected due to, for example, motion of the human hand.

Various other such functions can be used as well within the scope of the various embodiments as would be apparent to one of ordinary skill in the art in light of the teachings and suggestions contained herein.

FIG. 1A illustrates a first image 100 of an example environment in which a robot 102, or at least partially automated assembly, can perform various tasks. Such an environment for operating a robot may include any appropriate environment, such as a laboratory, home, warehouse, workbench, vehicle, hospital or factory, among others. The environment may be co-located with a user or operator of the robot, or may be at a different geographic location as a user or operator. In at least some embodiments, this robot can be operated, at least in part, using human-provided commands, which may be interactive, recorded, or synthesized by an algorithm. Further, while blocks are illustrated as example objects with which an object can interact, it should be understood that such objects could be any physical objects that could be located in one of these operating environments. This image 100 may be captured by a camera, of one or more cameras, that are used to capture image or video data about this environment, to help guide the robot 102 in performing tasks or actions within the environment, such as by using computer vision analysis to determine positions and orientations of the robot and one or more objects for interaction, as well as objects with which to avoid collisions. Although described as using a camera to generate sensor data or image data, this is not intended to be limiting, and the sensor data may be generated using any type(s) of sensor(s), such as LiDAR sensors, RADAR sensors, ultrasonic sensors, IMU sensors, and/or other sensor types. In addition, the sensor data may be representative of various data representations, such as images, point clouds, projection images, and/or other sensor data representation types.

Figure 1B:
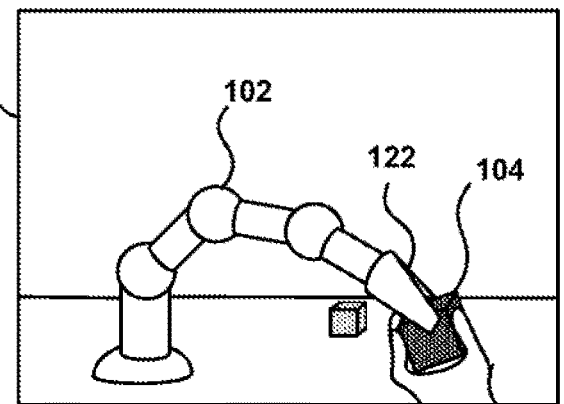
Figure 1C:
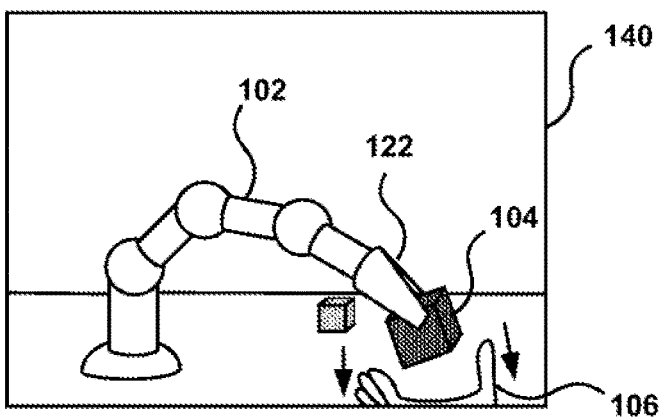

In this example, a human is holding a block 104 in a human hand. A task to be performed by the robot 102 may include performing a handover task, which can involve causing a gripper or other such portion of the robot 102 to perform a grasp action 122, as illustrated in image 120 of FIG. 1B, and hold the block 104 in such a way that the human hand can let go of the block and the block 104 will remain held by the robot 102. The robot may then perform various actions with respect to the block, or another such object taken during a handover action, such as to move the block 104, as illustrated in image 140 of FIG. 1C, and set the block down in a target position.

As mentioned, it can be desirable during a task such as a handover to avoid any contact between the robot and the hand, or other portion, of the person holding the object for the handover action, unless that contact is required for performance of the task. Avoiding contact can prevent pinching or causing any harm to the person, as well as preventing the human from dropping or damaging the object in response to the unexpected contact. It can also be desirable for the robot to move towards the object held by the person in a smooth, reliable, and intuitive manner, such that the person is not startled by the movement or triggered to drop or damage the object as a result of a "jerky" (e.g., sudden change in speed and/or direction) or unexpected movement of the robot. In some embodiments, causing the human to move unexpectedly may not damage the object, but may result in an obstruction of a camera used in guiding the robot or other such undesirable result, or at least may delay the performance of the handover as the robot will need to adjust to the new position of the object.

Approaches in accordance with various embodiments can attempt to overcome at least some of these and other such deficiencies with respect to prior and current approaches to operating a robot, or at least semi-automated assembly or mechanism, to perform one or more tasks. Such approaches can take advantage of a fast, reactive, and safe predictive robot control system, useful for tasks such as human-robot handovers, which is easily extensible to include new, additional, or alternative constraints. Such a system can allow humans to hold arbitrary objects, which may be previously unknown or unencountered by the robot, in arbitrary ways or orientations, as long as the objects are within an operable range of the robot. Such an ability to handover objects to, and from, humans in a wide variety of settings and conditions can be critical for collaborative robots in varying environments such as factories and homes. In at least one embodiment, such a robot control framework can provide for fast, joint-space model-predictive control for the tasks such as human-to-robot (H2R) and robot-to-human (R2H) handovers. Such a reactive system can be accelerated in performance by, for example, configuring the control functionality to be executed using a parallel processor implementation, such as may use multiple graphics processing units (GPUs), parallel processing units (PPUs), data processing units (DPUs), and/or processor cores. Such a system can allow for incorporation of constraints that would have been difficult to tune in prior systems, which can help provide for safer and faster handovers and other such actions. These constraints can, for example, help to prevent occlusions of an object as a robot attempts to grasp that object, and can develop and change the task model as appropriate to ensure that an intent of the actions of the robot is clear to the human involved in the handover.

Figure 1D:
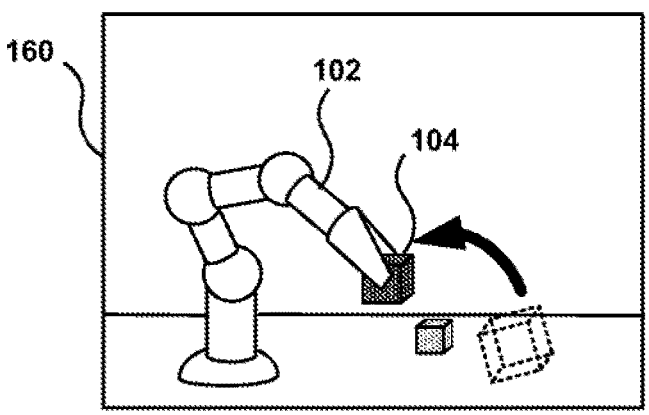

In an example system, tasks and actions can be performed for arbitrary objects in ways that are planned to ensure that every motion taken by a robot is reliable, intuitive, and obvious to a human such that the human understands the intent and is not surprised by any of the motions. This can be accomplished in various embodiments by optimizing a sequence of motions to be performed by a robot at each time step. As an example, FIG. 160 of FIG. 1D illustrates the gripper of a robot 102 approaching a block 104 to be grasped as part of a handover task. In many existing systems, the robot 102 would, at each time step, determine a single next motion or action to be taken. Determining each individual action or motion individually and (at least somewhat independently) can result in a jerkiness or irregular trajectory of motion of the robot towards the block. Instead, approaches in accordance with various embodiments can optimize for motions 162 or actions over a number of future time steps. In this way, the control system can optimize a current motion not only based on current conditions, but also for future conditions that are predicted to exist as a result of the current motion. In this way, a current motion might be selected that is different than would be selected if considering this current motion by itself, where this current motion will put the robot in a better position for future actions to result in smooth and predictable motion. This prediction of future motions can also be updated at each time step, so that the system is still reactive and can update motions or actions quickly based on any changing conditions in the environment, such as a motion or rotation of the object to be grasped, while still providing for improved smoothness and predictability in motion. Such forward projection also helps to enforce various constraints, such as to ensure that the robot never occludes a portion of itself from a camera or other sensor that captures image data or other sensor data used to guide the robot, and also does not have to reverse motion or change trajectories to avoid such occlusions as may have been necessary in prior systems that determined each motion independently. In at least one embodiment, there may be smoothness rewards (or jerk penalties) applied when determining motion over these future time steps to help optimize these predicted future motions as part of a model-predictive control (MPC) scheme that considers human comfort as part of the optimization process. An example MPC framework can integrate perception and complex domain-specific constraints into the optimization problem. Other optimization software or technology, or predictive frameworks, can be used as well in other embodiments, as may allow for use of different cost terms or criteria to be used for optimization. A learning-based grasp reachability model can be used to select candidate grasps which maximize the manipulability of a robot, providing the robot with more freedom to satisfy these constraints. A machine learning model (e.g., neural network) based force (e.g., torque) classifier can also be used that can detect contact events from noisy data.

In at least one embodiment, a system for performing actions such as handovers of arbitrary objects can use one or more learning-based grasp planners. Grasps can be selected based upon factors such as grasp stability and one or more task constraints, and a robot can be driven towards a gripper or other end-effector, pose to complete the handover process. In order to determine an optimal, desired, or suitable grasp position, and associated motion of the robot to that grasp position, a machine learning model (e.g., neural network) can be used that is trained to predict the manipulability of a grasp pose for motion-aware grasp selection. Together with grasp stability, such an approach allows the control system to select a stable grasp position and action, which is also reachable and manipulable in a smooth and predictable fashion. Additionally, compared with using inverse kinematics to check the reachability of each grasp sequentially, such an approach can evaluate the reachability and the manipulability of a batch of grasps in parallel, which can be more efficient for real-time robotics tasks such as human-to-robot handovers.

In addition to the grasp action, another challenge involves planning smooth and natural motion from a current position and orientation of the robot to a determined grasp position. Given a selected grasp, a robot in an existing system is typically driven towards the grasp end-effector pose by local (or non-global) policies, such as may include Riemannian Motion Policies or visual servoing. Natural motions are not, however, comprised only of accelerations toward a particular end-effector pose; these motions consider how to reach that pose while obeying complex task constraints. In addition, without planned motions, a robot might choose grasp approaches that are farther away, resulting in slower or less efficient task performance. A system that uses a framework such as a highly-parallelized stochastic MPC framework can provide for real-time motion planning, while also allowing for incorporation of a range of complex task-specific constraints, such as to prevent robot-hand occlusions. To bridge the gap between grasp selection and motion planning, an MPC framework can incorporate a grasp selection procedure into an optimization given a set of candidate grasps. Such a unified MPC framework can allow a system to select the grasp and plan motion concurrently, while taking grasp reachability and domain specific constraints into account. Further, during a physical handover phase, such as from a first contact of the receiver's hand on an object until a release of the object, force feedback can be used to decide when to release the object (R2H) or when to grasp the object (H2R). In some instances, raw force/torque sensor readings may be noisy and/or hard to interpret directly. Accordingly, data representing how humans interact with a moving robot can be collected and used as training data to train a machine learning model (e.g., neural network) to detect when contact between a hand and gripper (or other human-robot interaction) occurs. This detection can be coupled with vision during the physical handover phase to trigger an appropriate robot grasp or release action.

Figure 2A:
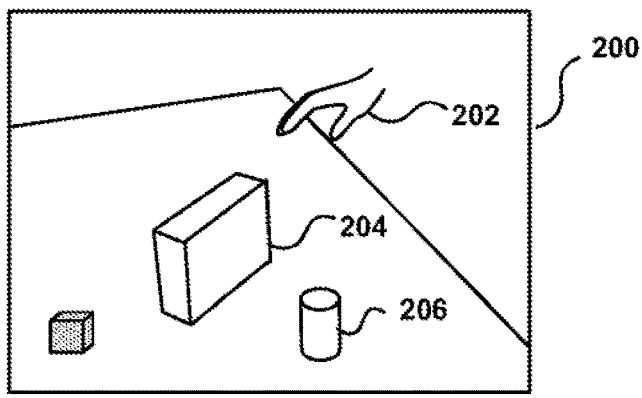
FIGS. 2A, 2B, 2C, and 2D illustrate approaches for a robot to grasp an object during a handover operation, in accordance with at least one embodiment.
Figure 2B:
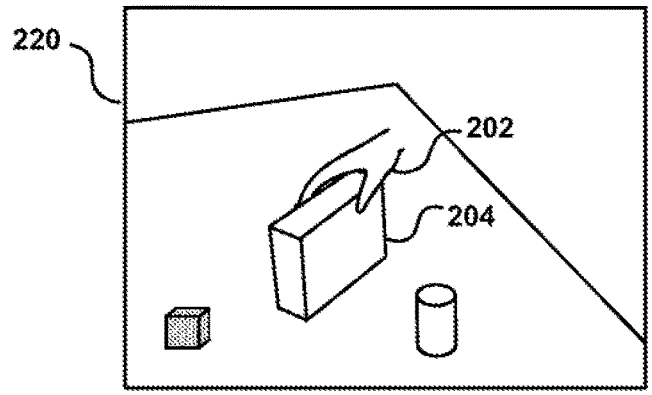

The images in FIGS. 2A through 2D illustrate different stages of a human-to-robot handover of an object in accordance with at least one embodiment. Image 200 of FIG. 2A illustrates a robot 202 in a wait stage, where the robot 202 may remain idle until the robot, or a system at least partially responsible for instructing or controlling the robot, detects a human hand holding an object 204 that is to be taken by the robot 202. During a wait stage, the robot may move to a home position, and not otherwise move until the robot detects a human holding an object in the workspace, or a movement instruction or trigger is otherwise received or determined. Once an object being held is detected, the MPC framework can analyze various grasp and approach positions 206 that the robot can use to approach and grasp the object 204. As mentioned, this can include determining motions over a future sequence of time steps, even though only a next motion may be used at each time step before those motions may be re-determined. During an approach stage, as illustrated in image 220 of FIG. 2B, this robot can move along an approach vector, using the determined optimal, desired, or suitable motions, towards the object. In one embodiment, a standoff pose is 15 cm from a final grasp position for the object, with an optimal, desired, or suitable path to arrive at this standoff position being determined by the MPC system. Once the robot reaches the determined standoff pose, the robot can grasp the object with a blocking policy during a grasp stage, as illustrated in image 240 of FIG. 2C. A blocking policy can be used because, as the robot gets closer to the object, estimates for body tracking, segmentation, and/or grasp can become less reliable. After moving the end-effector forward to the grasp position, the robot can close its gripper or end-effector, and retreat to the standoff pose. Missed grasps can be detected by observing the distance between the gripper fingers after closing. After a failed grasp, the robot can return to an approach phase, and attempt to grasp the object again. Instead of or in addition to using vision, a classifier can be trained to, given a raw force or torque signal, detect contact with the gripper. If the human pushes the object into the robot gripper, the grasp motion can terminate early and the gripper be closed. The robot can then perform an action with the object, at least after a human hand has released the object, such as to place the object in a preset position during a drop stage, as illustrated in image 260 of FIG. 2D.

Figure 3A:
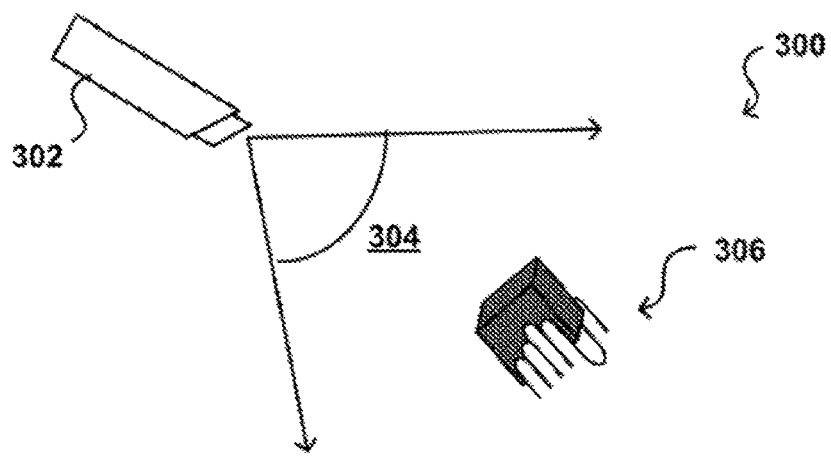
FIGS. 3A, 3B, and 3C illustrate reactive actions that can be taken by a robot due, at least in part, to a change in a state of an environment, according to at least one embodiment.
Figure 3B:
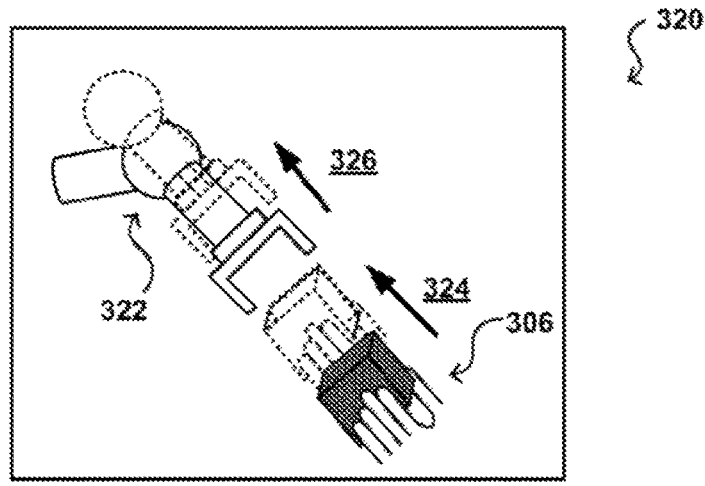
Figure 3C:
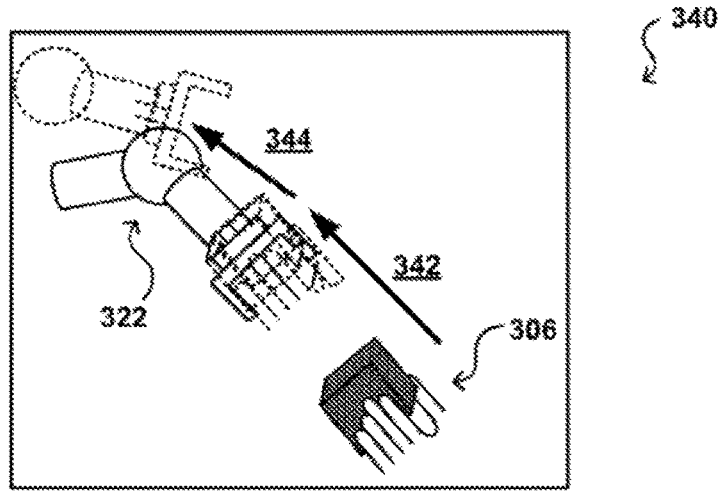

As mentioned, a camera system 302 or other monitoring system can be used to capture information useful in determining a state of one or more objects in an environment, such as a hand holding an object 306 within a field of view of the camera as illustrated in the example view 300 of FIG. 3A. In addition to adjusting grasp options and motions at each time step for changes in a location of the object, in order to optimize the path of motion, the predictive control system can also attempt to make rapid adjustments necessary to enforce constraints on the motion. For example, consider the situation 320 of FIG. 3B where a user unexpectedly moves the object 306 in a direction 324 toward the end-effector 322 of the robot, such as where the person is trying to be helpful in placing the object in the end-effector. As this may result in unexpected contact between the robot and the person, which would violate a constraint, the system can quickly determine a corresponding motion 326 or acceleration of the robot in response to this change in state. As illustrated in the example 340 of FIG. 3C, this can also result in adjusting the motion for an updated path 344 in addition to avoiding a collision or contact due to unexpected motion 342. However, in at least some embodiments, a robot may pull away from unexpected motion in a corresponding direction without updated path planning if the path planning would not allow sufficient time to avoid the collision or unintended human contact.

A system in accordance with at least one embodiment can generate a set of candidate grasps for human-to-robot handovers by tracking the pose of at least a relevant portion of the robot and at least a relevant portion of the human to perform the handover. This can include, for example, tracking robot pose using Dense Articulated Real-Time (DART) tracking, and tracking the human body using, e.g., a body tracking software developer kit (SDK). Tracking of the object and hand can be performed using this tracked body data, such as by segmenting the hand, and the object in hand, using a pretrained segmentation model. Given a segmentation, as may correspond to a segmented object point cloud inferred using this segmentation model, a temporally-consistent version of a six degree of freedom (DoF) GraspNet, or other suitable neural network, can be used to generate potential grasp positions.

A neural network such as GraspNet can estimate a score for each predicted grasp to measure grasp stability. Because considering all potentially stable grasps may be challenging, and to reduce the number of grasps being considered, a learned ranking or cost function can be used that can predict manipulability of grasp pose. The manipulability of a grasp pose can provide a measure of how far a robot is to a singular configuration. Such a metric can be particularly valuable when trying to reach a moving target, as a highly manipulable grasp is likely to stay reachable as the object moves. Instead of using simple heuristics, proxy representations, or required interpolation of precomputed data as in prior approaches, an approach in accordance with at least one embodiment can directly learn the manipulability metric from data to quickly predict scores.

In one example, a manipulability metric $\mathcal{M}$ is given as $|J^T J|$ where J is the Jacobian of the inverse kinematics (IK) of the grasp. If no IK solution exists, a negative twist-distance between the closest achievable end-effector nose and the target can be used, as may result in:

$$\mathcal{M}(g) = \begin{cases} |J^T J| & \text{if } IK \text{ exists} \\ -dist_{twist}(g, e) & \text{otherwise} \end{cases}$$

where |•| is the determinant operator, J is the Jacobian of the IK solution of grasp g, and $dist_{twist}$(g, e) is the twist distance between grasp g and the closest achievable pose of the end-effector pose e.

Joint limits of the robot can be further incorporated into the manipulability score, such as by using a joint-limit performance metric to form a weighting matrix. In at least one embodiment, the metric for each joint can be given by:

$$\theta = \{\theta^i : i = 1, 2, \ldots, DoF\}:$$

$$\mathcal{P}_{joint\_limit}(\theta) = \frac{(\theta_{max} - \theta_{min})^2 * (2\theta - \theta_{min} - \theta_{max})}{4(\theta_{max} - \theta)^2 * (\theta - \theta_{min})^2}$$

This metric can be at a minimum (0) in the middle for the joint ranges, and maximum at the extremes of the joint limits. The weighting matrix can be a diagonal matrix with entry on the diagonal corresponding to each joint, as may be given by:

$$\mathcal{W}^{ii} = \frac{1}{\sqrt{1 + |\mathcal{P}_{joint\_limit}(\theta^i)|}}$$

The joint-aware manipulability can then be computed as $|J^T \mathcal{W} J|$ for grasp poses that have IK solutions. This result can be used to generate a dataset for training a joint-limit-aware reachability model. To facilitate training, a dataset of grasp poses and corresponding manipulability scores can be generated, and a multi-layer perception may be trained with the mean squared error loss. The input of the MLP can be the 6-DOF grasp pose (x, y, z, roll, pitch, yaw)$\in \mathcal{R}^6$ and the output may be the manipulability score. During experiments, a median inference time for once such trained model was 0.0013 seconds.

To better coordinate the timing for the physical handover phase, a feed-forward neural network can be trained to detect a contact event between the hand or object and a robot gripper, end-effector, or other relevant portion or mechanism. Such a network can take as input the raw sensor data, as may include data for joint velocities, efforts, force, and torque, for the last T=5 steps, and can predict a probability of a contact event. An example model is a temporal convolutional neural network which encodes each individual timestep through a two-layer MLP, then performs two one-dimensional (1D) convolutions over the historical data, before another MLP (with dropout) predicts a single output indicating whether a force event was detected within the relevant window.

Figure 2C:
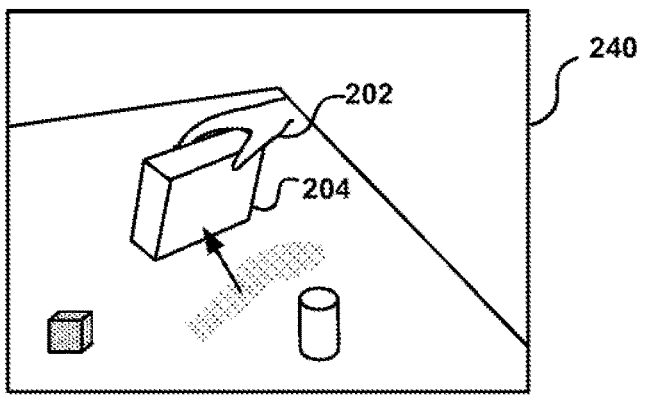
Figure 2D:
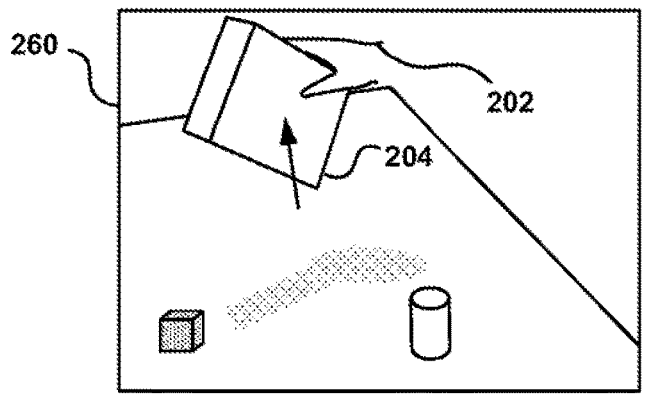

A framework, such as an MPC framework, can encode heuristics that promote fluid human-robot handovers in reactive motion generation. These can include, for example, heuristics that encourage a gripper of a robot to move in a straight line, avoid collisions between a robot and a human (or other object), ensure that the human hand remains in view of at least one camera or monitor associated with the robot (to an extent possible), and reduce jerkiness or favor smoothness of motion of the robot during operation. Given a set of grasps G, a robot can be caused to move to one of the grasp poses $X_g \in G$, and then grasp the object from the human, as illustrated in FIG. 2C. As some heuristics may correspond to operations in joint space while others may correspond to Cartesian space for one or more links, this problem can be formulated as a kinematic joint space trajectory optimization problem, which can then be solved in real time or near real time by, for example, leveraging the stochastic MPC.

Given a joint position $\theta_0$ and velocity $\dot{\theta}_0$ at timestep 0, joint accelerations $\ddot{\theta}_{t \in [0, H-1]}$ for a robot can be calculated across horizon H timesteps that are determined to minimize cost terms $C(\cdot)$ while also satisfying one or more constraints. Example constraints can be given by:

$$\min_{\ddot{\theta}_{t \in 0, H-1}} C_g(G, \theta_t) + C_{sl}(\theta_t, \dot{\theta}_t) + C_{manip} + C_{stop}$$

s.t. $S_e(\theta_t) < 0.0$ $S_r(\theta_t) < 0.0$ $\dot{\theta}_t = \dot{\theta}_{t-1} + \ddot{\theta}_t dt$ $\theta_t = \theta_{t-1} + \dot{\theta}_t dt + 0.5 \ddot{\theta}_t dt^2$ $\theta_{min} \le \theta_t \le \theta_{max}$ $\dot{\theta}_{min} \le \dot{\theta}_t \le \dot{\theta}_{max}$ $\ddot{\theta}_{min} \le \ddot{\theta}_t \le \ddot{\theta}_{max}$ where this first equation contains cost terms formulated for human-robot handover. Also illustrated is an equation that lists manipulability and stop cost terms that aid MPC in avoiding local minima and overshooting, respectively. Collision avoidance constraints are also illustrated that can help to prevent a robot from colliding with the environment, a human, and itself. Euler integration equations are illustrated to obtain joint position, as well as joint velocity from joint acceleration. The final three equations provide bounds on the robot's joint position, velocity, and acceleration.

Given a target pose $X_g$ and the current gripper pose $X_t = FK(\theta_t)$ computed using the forward kinematics of the robot at the current joint configuration $\theta_t$, a pose distance metric $\text{dist}(X_t, X_g)$ can be defined, as may be given by:

$$\text{dist}(X_t, X_g) = \|\alpha_1(I - {}^wR_g^T {}^wR_t)\|_2 + \|\alpha_2 ({}^wR_g^{Tw}d_t - {}^wR_g^{Tw}d_g)\|_2$$

where ${}^wR_g$ and ${}^wR_t$ are the rotation matrices of pose $X_g$ and $X_t$, respectively. The translation vectors of $X_g$ and $X_t$ are represented by ${}^wR_g$ and ${}^wR_t$, respectively.

A given gripper pose can be reached, in at least one embodiment, by using the above distance metric as a goal cost $C_g(\cdot) = \text{dist}(\cdot)$. An optimization process can also attempt to optimize for reaching one pose from a set of grasp poses G by writing the goal cost as the distance between the current gripper pose $X_t$ and the closest pose in the goal set, as may be given by:

$$C(X_t, G) = \min(\text{dist}(X_t, X_{g \in G}))$$

Such a formulation of reaching a goal set allows MPC to reason about the various grasp poses inside the optimization, while also taking into consideration the other heuristics and constraints. Such an approach can allow an MPC-based system to move fluidly to another grasp from the currently determined grasp, given one or more new constraints, such as where the human hand holding the object to be grasped moves to a position at least partially inside the current grasp region.

In certain robot systems, the robot may follow very circular trajectories in Cartesian space due, at least in part, to the presence of many revolute joints in the manipulator. These circular trajectories are hard for users to anticipate or expect, particularly for those with minimal domain knowledge. At least partially to address this issue, a cost term can be used that penalizes the linear velocity of the gripper, or other end-effector of the robot, in directions that are not parallel to the vector connecting the current gripper position to the goal position, as may be given by:

$$\hat{d}_g = \frac{d_g - d_t}{\|d_g - d_t\|}$$

The current velocity of the gripper can be calculated by using the kinematic Jacobian $J(\theta_t)$ at the current joint configuration $\theta_t$ and the current joint velocity $\dot{\theta}_t$, as may be given by:

$$\dot{d}_t = J(\theta_t) \dot{\theta}_t$$

This vector can then be normalized to calculate the current gripper motion direction $\hat{d}_t$. The cost can then be written as:

$$C(\hat{d}_t, \hat{d}_g) = 1 - \hat{d}_t \cdot \hat{d}_g$$

This cost becomes zero when both vectors are parallel.

During gripper motion, effort can be taken to avoid collisions between a robot and nearby objects, such as a table or ground supporting the robot, or a human hand. In addition, effort can be taken to attempt to prevent the hand from being occluded by the robot during motion of the robot. In at least one embodiment, a table (or other underlying surface or support) can be represented as a cuboid (or other shape), and a human hand represented as a sphere (or other shape). A line used to connect an origin of a monitoring camera with the human hand position can be used to build a capsule or other spatial representation. The links of the robot can also be represented with spheres, or similar geometric constructs, and then the signed distance computed between the robot and the environment via an analytic function $S_e(\theta_t)$. Additionally, robot self-collisions can be avoided, at least in part, by using a machine learning model (e.g., neural network) trained using a loss or cost function, such as presented above. The machine learning model can output the signed distance between the two closest links given a joint configuration $\theta_t$, which can then be used with $S_r(\theta_t)$, above. Such an approach can help the robot avoid colliding with the human hand, and keeps the hand from causing an occlusion.

To allow reactivity, the optimization problem can be solved, at least in part, by using stochastic model predictive control (also known as sampling-based model predictive control), which can work with many cost terms. Stochastic model predictive control can optimize by sampling action sequences for many particles from a distribution, rolling out these actions, computing the cost incurred by each particle, and then using these costs to update the distribution. By iterating through this process, given a large number of particles, stochastic MPC can generate motions at 50-100 hz, for example, which is sufficient to maintain reactivity for human robot interaction. Stochastic MPC cannot handle constraints in at least some embodiments, so these constraints can be set up in an optimization problem as cost terms with large weights. This optimization problems can also be used for motion generation during other phases, where the goal cost can be changed to be a L2 loss on the joint configuration.

Figure 4:
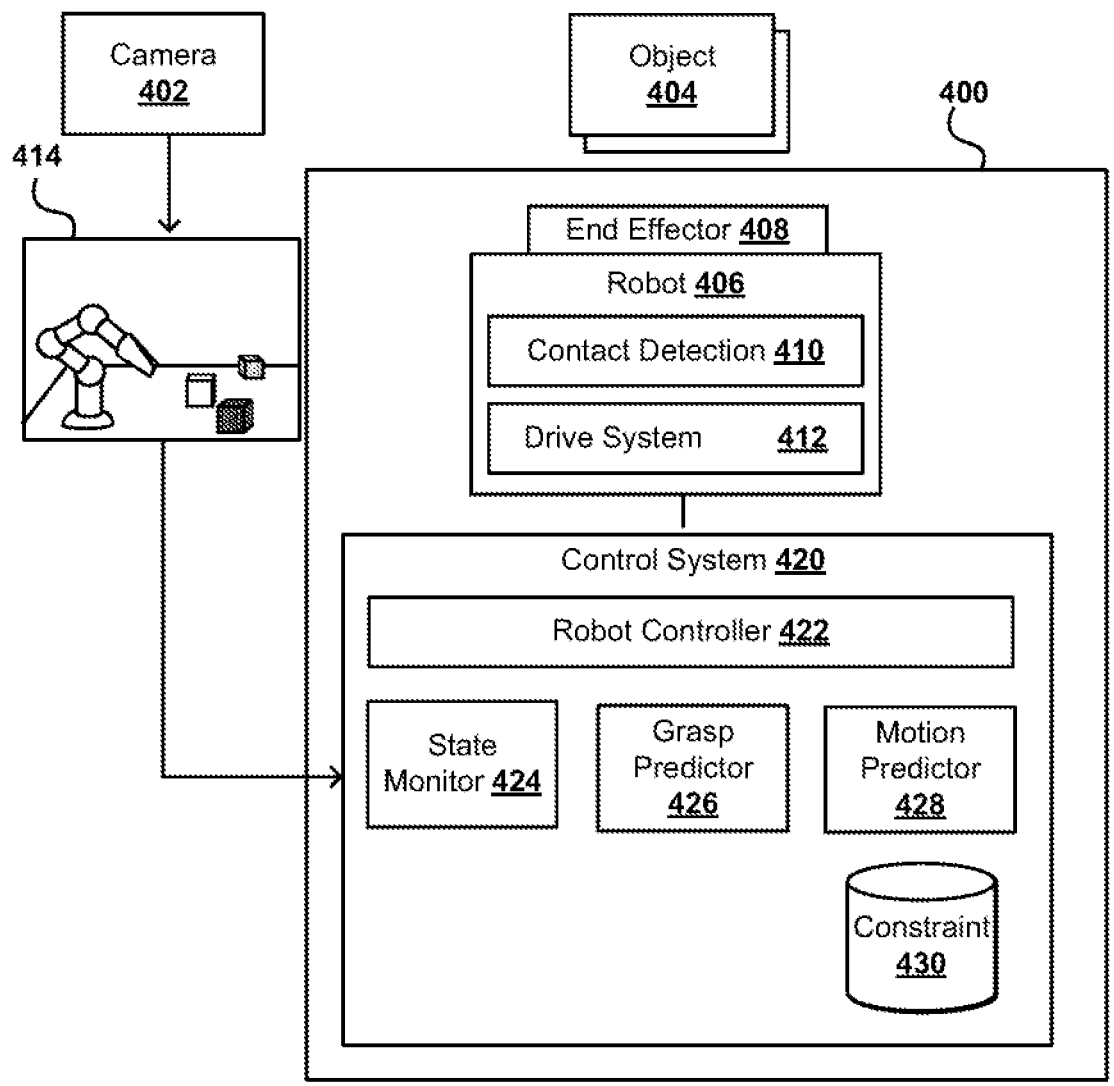
FIG. 4 illustrates an example system for causing a robot to perform one or more actions in an environment, according to at least one embodiment.

FIG. 4 illustrates components of an example system 400 that can be used to perform actions such as automated handovers, in accordance with at least one embodiment. In this example, one or more cameras 402 can be used to capture image data 414 (e.g., a sequence or images or video) representative of a physical environment including a robot 406 and at least one object 404 with which that robot is to interact. The camera can include a camera for capturing two-dimensional images, a camera for capturing stereoscopic images, or a camera for capturing images that include color and depth information (e.g., RGB-D images). Other sensors or devices may be used to capture a representation of the environment as well, as may include depth sensor, LiDAR scanners, and/or the like. This captured environmental data can be fed as input to a state monitor 424 of a control system 420. This input can be updated and provided as appropriate, such as for every captured frame of a video stream or in response to any detected motion in the environment.

In this example system 400, the state monitor can use this (and any other relevant) input to generate a representation of the current state of the environment. This can include, for example, a current position and orientation of a robot 406 or portion of a robot 406, such as an end-effector 408 or gripper, as well as that of at least one object 404 with which the robot 406 is to interact. The state monitor can generate any appropriate type of representation, such as a 3D model or point cloud representing the current state of the environment. This determined or predicted state information can be provided to various components of the control system 420, such as a grasp predictor 426 and a motion predictor 428. As discussed herein, at each time step in this process, or at least at periodic time steps, a grasp predictor 426 for a handover operation (or other location and orientation predictor for other types of tasks) can determine one or more target grasps, or other target locations and orientations of at least an end-effector 408 (or other portion) of the robot 406 to at least start a determined task, action, or other interaction with the object 404. This can include updating a determined grasp in response to any change in the environment, as may correspond to a change in position or orientation of the robot 406, the object 404, a hand, or other support holding the object, or another object or entity in the environment, among other such options. Updating the target grasp can help to ensure that the end-effector of the robot 406 does not perform undesired actions, such as to contact a human hand or obstruct a view of the camera 402, as well as to ensure that the grasp of the object 404 is sufficient to hold that object 404 without risk of dropping or damaging the object 404, for any potential changes in position or orientation of that object 404.

At each time step, a motion predictor 428 can also analyze the current state data, as well as any updates to the target grasp determination. As mentioned, in some embodiments the grasp predictor 426 can provide a full set of potential grasps, and the motion predictor 428, which can include a motion path predictor or MPC, can select the current target grasp to be used. In some embodiments all potential grasps in a set can be treated equally, as long as those grasps satisfy one or more minimum criteria, while in other embodiments there may be some weighting or ranking of the relevant grasps, such as may be determined based upon factors such as distance or strength of grasp position. The motion predictor 428 can consider any constraints on the motion, and can use a motion planner or optimizer application, algorithm, or neural network, for example, to predict an optimal, desired, or suitable path between a current position and orientation of the robot and a current position and orientation of the object, as well as the hand holding the object. As discussed herein the optimization can take other factors or constraints into account as well, such as to prefer smooth or straight-line motion, or to avoid camera obstructions. In at least some embodiments, state data may be received from the robot at a higher frequency than state data is updated based upon camera data, such that motion data may be updated more frequently than grasp data in some embodiments. The motion predictor 428 can then determine a sequence of motions, or a path of motion to be performed over a number of future time steps. The motion predictor 428 can then provide information for this sequence or future motions, a first subset of these future motions, or only a first predicted motion to a robot controller 422 of the control system 422. In this way, motion will be optimized by looking over a range of future motions, rather than just a current motion, which can help with factors such as smoothness of motion and predictability. The robot controller 422 can then determine instructions to cause the robot 406 to perform an action corresponding to that motion, if not already provided by the motion predictor 428, and can send those instructions to the robot 406, where a drive system 412 or other mechanical control of the robot 406 can cause the robot 406 to perform that motion, such as to perform a determined motion for a current time step to bring an end-effector 408 of the robot 406 to a target position relative to the object 404. In many instances this will result in the end-effector being moved toward the target grasp position and orientation, but due to factors such as motion of the hand or object, may involve moving away from the object to avoid a collision or obstruction relative to the hand or object. In this example, the end-effector 408 may have one or more contact sensors that can provide contact data to a contact detection system 410, which can provide this information to the drive system 412 and/or robot controller 422 of the control system 420. In some embodiments, the drive system 412 may have a built-in safety mechanism that causes the robot 406 to stop if contact is detected. In some embodiments, a robot controller 422 may alternatively, or additionally, update state information to include the contact information, which can then be provided to the motion predictor 428 to determine any subsequent actions or motions to be taken, such as to move away if the contact is not a desired contact. In some embodiments, if the end-effector 408 is in the target grasp position and orientation and an anticipated contact is detected, then the motion predictor 428 may provide information to the robot controller 422 to cause the robot 406 to stay in that position for at least a determined period of time to allow for the hand to move away and for the handover action to be completed. In other embodiments, a robot controller 422 may make such a determination. Such a system can be used to control a robot 406 to perform other tasks as well, such as may require a determined position or orientation to be determined with similar, or alternative, constraints being applied. In some embodiments, a grasp predictor 426, motion predictor 428, or robot controller 422 may need to determine applicable constraints for a given task or action, as may be obtained from a constraint repository 430 or other such location.

Using a system such as that illustrated in FIG. 4, experiments were conducted with a Franka Emika Panda arm, as well as an externally-mounted Azure Kinect RGBD camera with 1280×720 resolution. A perception pipeline, such as is illustrated in FIG. 4, was used to generate the potential grasps. The system was distributed across three computers, with an additional realtime desktop for Franka control. Four NVIDIA RTX 2080ti GPUs were used for perception and MPC. Performance of this example system was evaluated using three objects with different shapes and sizes, including a banana, a cracker box, and a pepper bottle. Handover trials for these objects were repeated until three successful handovers were recorded, after which system performance was measured using metrics including success rate, approach time, and the total time for a successful handover. Other metrics observed for the experiments including the velocity, acceleration, and jerk during a given handover.

The approach used a selected baseline method, as well as grasp selection criterion and a learned reachability metric $R(x_{appr})$, described elsewhere herein, to determine which grasps are reachable. This set of potential grasps can then be further restricted to include only grasps that are also highly manipulable, as may be given by:

$$C = w_s \min(s - s_{min}, 0) + w_{prev} d(x_{appr}, x_{prev}) + w_{home} d(x_{appr}, x_{home}) + w_R R(x_{appr})$$

where s and $s_{min}$ are the grasp score and minimum acceptable score, $x_{appr}$ and $x_{prev}$ denote the current and the previous chosen grasp respectively, $x_{home}$ denotes the pose of the end-effector at the home position, and $w_s$, $w_{prev}$, $w_{home}$, and $w_R$ are weights. Above, $d(x_1, x_2)$ is a distance metric with both a position component and a rotation component. The above baselines were compared with the following variations of the proposed approach, including: 1) MPC/MPC-R: using MPC for motion planning towards one selected grasp (with or without a reachability metric); and 2) MPC-Goal-Set: using MPC to generate motion given a set of grasps. It can be noted that the reachability metric is inherently embedded in the cost function of multi-goal MPC.

The efficiency of the approach was evaluated Handover Location in response to H2R handovers at different locations and different ways of holding these objects. The process involved handing over three objects at three locations, which were generally left, center, and right with respect to the robot. For each location, the object was handed over three times using three different ways of holding the object. MPC was found to reduce the approach time (11.5 s to 7.1 s) and total time (13.3 s to 7.9 s) significantly with respect to a prior approach, and was also found to improve the success rate from 85.7% to 88.3%. The experiments also investigated the reachability model, where the reachability metric was observed to allow for improved grasp selection relative to a prior approach, improving approach time by two seconds success rate of MPC by 7.5%. This is due at least in part to the fact that, with the reachability model, the robot tends to choose more reachable and manipulable grasp poses. The MPC-GoalSet variant was observed to have a slightly longer approach time and slightly lower success rate compared to MPC/MPC-R, but it was observed to achieve smoother motion with significantly less jerk.

Performance was further investigated by rotating each object along its standing axis by approximately forty-five degrees after a start of robot motion. All MPC-based systems demonstrated a lower approach time and overall total time for successful handovers as these systems can quickly react and adapt to changes in object orientation. The reachability model was observed to promote lower approach time while maintaining a similar success rate for the baseline method, as well as to improve the success rate for the MPC variant. It was observed that, while MPC-GoalSet achieved the lowest approach time for successful handovers out of those tested, this system had a lower success rate when, for example, handling changes in orientation, which may be due at least in part to inconsistency in grasps over time. To better understand the motion pattern, the experiments recorded metrics including robot position, velocity, acceleration, and jerk during motion. In general, the MPC-based approaches tested were observed to have more consistent velocities and accelerations compared with the baseline approach. An approach as presented herein was observed to have fewer sudden accelerations, resulting in less jerk. In particular, an MPC-GoalSet system was observed to achieve the least jerk, as in this formulation MPC optimizes to reach a single grasp from the grasp set, while considering the current position, velocity, and acceleration of the robot.

Another experiment was conducted to validate that a system or approach as presented herein allows fluid H2R handovers, particularly with respect to a proposed prior baseline approach. In this experiment, four human participants were recruited who each were involved in two rounds of handovers to interact with two systems. Participants were instructed to hand over ten objects, from a selection of household objects, to the robot one at a time. The humans were then asked to rate the systems with Likert scale questions immediately after each round of interaction with the system. The experiment counterbalanced the order in which participants interacted with the two systems. After completing all interactions, participants were asked to rank the two systems in different dimensions and share their opinions and comments through open-ended questions.

Metrics such as the approach time and success rate were reported. An approach as presented herein was observed to take over the object with significantly reduced time except for two objects, in this case scissors and toothpaste, and the overall approach time was observed to be significantly shorter than the prior baseline system. The success rates for the systems were observed to be similar. From a human test participant perspective, the majority preferred the system as proposed herein, for reasons including the system being more predictable, less jerky, less aggressive, safer, and more comfortable with which to engage.

Figure 5A:
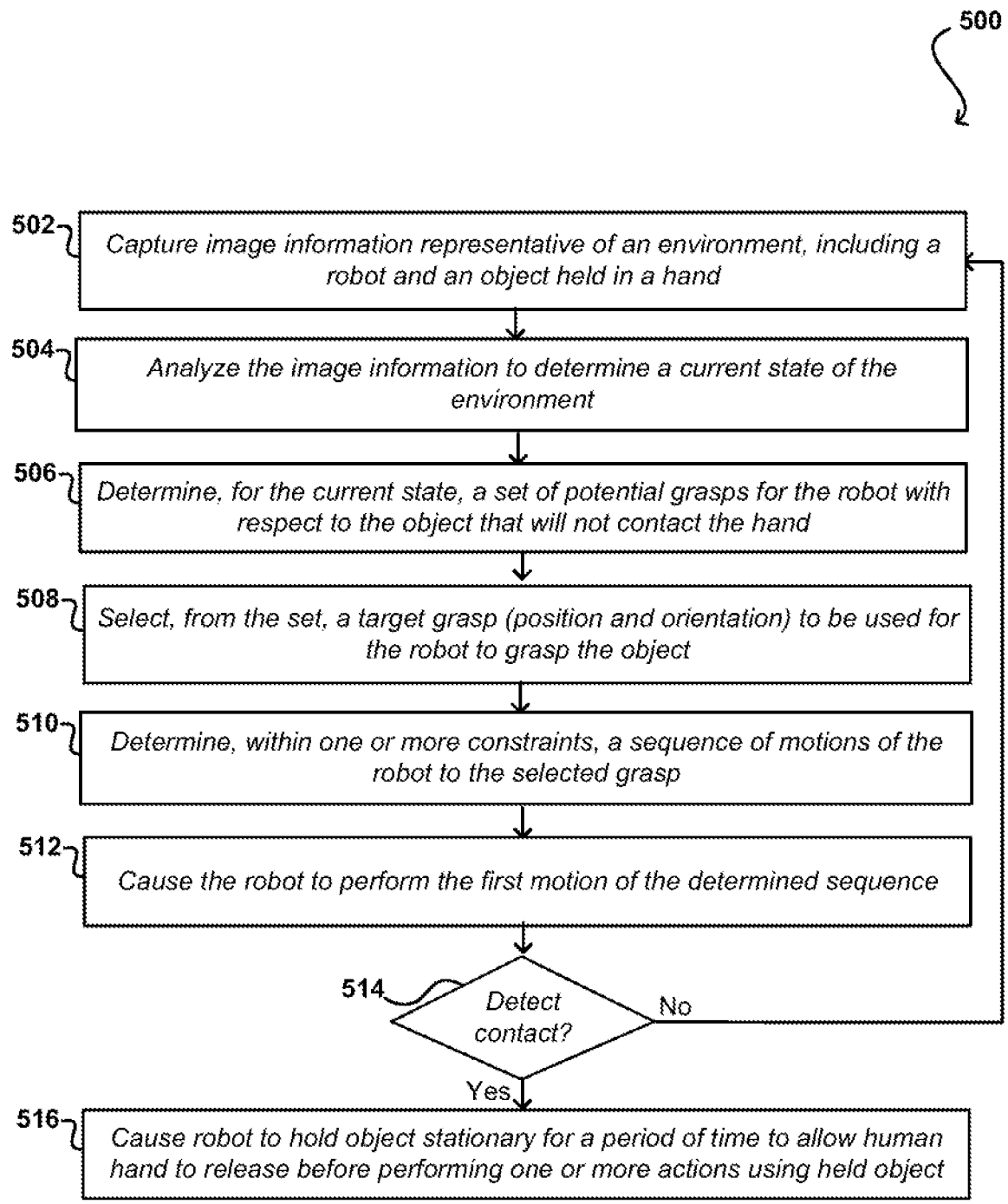
FIGS. 5A and 5B illustrate example processes for causing a robot, or automated assembly, to move to a determined location and orientation to perform a task, according to at least one embodiment.

FIG. 5A illustrates an example process 500 for causing a robot to perform a handover action, which can be performed in accordance with various embodiments. It should be understood that for this and other processes discussed herein, there can be additional, fewer, or alternative steps performed in similar or alternative orders, or at least partially in parallel, within the scope of the various embodiments unless otherwise specifically stated. Further, although this process is described with respect to robots and handover actions, aspects of such a process can be used with other types of automation and for other types of tasks as well within the scope of the various embodiments. In this example, image information, as well as potentially other sensor or imaging data, can be captured 502 or received that is representative of an environment, which in this example includes at least a portion of a robot, or automated assembly, and an object held in a hand, among other potential objects. This image information can be analyzed 504 to determine a current state of the environment. This can include, for example, a current location and orientation of the robot, the end-effector or gripper of the robot, the object for the handover, and a hand holding the object, as well as positions of the cameras or sensors. In some embodiments, a virtual representation of the current state of the environment can be generated and maintained, and can be updated with any changes in state, at least with respect to any object of interest or object that may generate an obstruction or collision. For this current state, a set of potential grasps (e.g., locations and orientations at which the end-effector can safely and securely grasp the object without contacting the hand holding the object) can be determined 506 for the robot with respect to the object that will not contact the hand or violate any relevant grasp constraint. In some embodiments, grasps may only be determined after causing the robot to maneuver to a standoff or other such location that is sufficiently near the location of the target handover or other such action. From this set of potential grasps, a target grasp can be selected 508 to be used for the robot to grasp the object. As mentioned, this is selected as being optimal, desired, or at least suitable for the current state of the environment at the current time, and can be updated at any subsequent time step for any future change in state (or other relevant change). In at least one embodiment, a full set of potential grasps can be provided to an optimization framework, which can then automatically select the optimal, desired, or suitable target end-effector pose as a target grasp, and this can be performed or updated for each time step or state evaluation.

Based at least in part upon the current state and the selected target grasp, a sequence of motions (or path of motion over a series of future time steps) can be determined 510 for the robot to reach the selected target grasp. This can include consideration of any relevant motion constraint, such as to avoid collisions, avoid camera obstructions, favor smooth or straight-line motion, and the like. This can be for a determined or set number of time steps, or amount of future period of time, or can be determined based at least in part upon a current state, or changes in state, of the environment. For example, for a relatively stable environment the sequence of future motions for optimization may not need to be as long, maybe only around five future motions or time steps, but if there has been a significant change in the environment, such as the human placing the object in the other hand in a significantly different location and orientation, then a longer period of time or sequence might be projected to attempt to provide for a smoother and more intuitive (at least from the perspective of the human) motion of the robot. Once the sequence or future path has been determined, and any optimization applied as discussed and suggested herein, the robot can be caused 512 to perform the first motion of this determined sequence. In some embodiments, the robot may be caused to perform a first subset of motions of this sequence, such as where predictions may not be made for each individual time step, or where a path of motion is followed until a change in that path is determined.

In this example, this process can continue until contact it is determined 514 that contact is detected with the object near the target grasp position. If not, then this process can continue by capturing mage information for a next time step and updating state and motion data. If contact is detected but with a different object, or in a position or orientation sufficiently different from the grasp, then this process can continue to attempt to recover from this potentially unexpected or undesired contact. If, however, it is determined 514 that the contact occurred between the end-effector and the object in a location and orientation that is proximate the target grasp, within at least an allowable variance due to safety or other constraints or requirements, then it can be determined that the robot was safely guided to its most recent target grasp, and unless other factors come into play that prevent such determination, it can be determined that the end-effector is properly grasping the object. The robot in this example can then be caused 516 to hold the object stationary for a period of time to allow the human hand to release the object before performing one or more subsequent actions using the held object. The robot can be caused to properly support the object during this handover as well, in order to ensure that the object is not dropped or damaged, or caused to unexpectedly contact the human after release from the human hand. In some embodiments, the robot can be caused to hold this object stationary for a period of time to allow the hand to move away, or may analyze updated state information to determine when the hand is at least a minimum distance away before performing a subsequent action. In some embodiments, a control system might also analyze motion and state changes over time to attempt to predict or infer, such as by using one or more neural networks, a future position or state of one or more objects in the environment, which can further help to optimize motion and path planning.

Figure 5B:
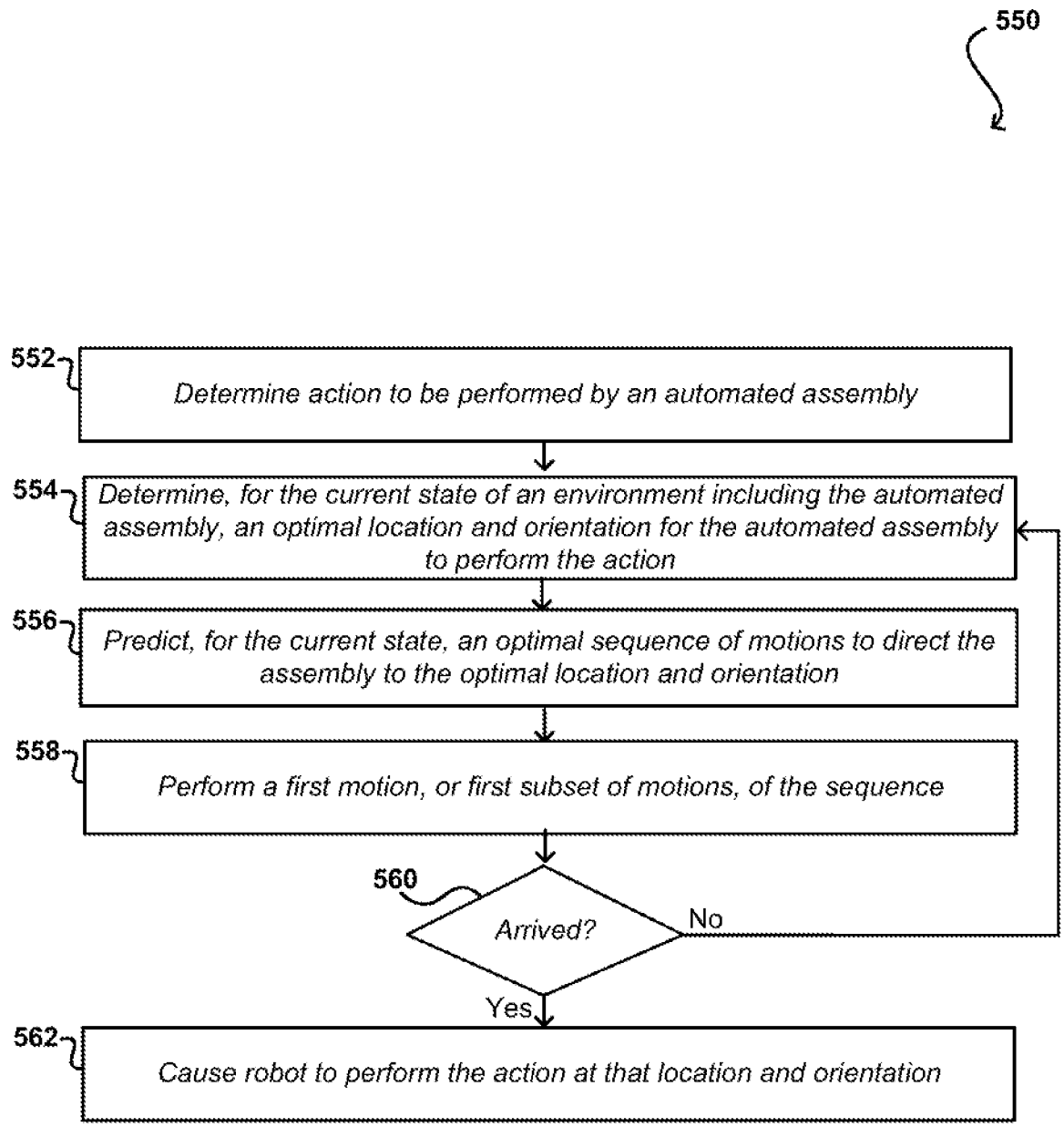

FIG. 5B illustrates another example process 550 in which any automated (or partially automated) assembly, device, component, or system can be caused to move using a similar approach, in order to be in a position and orientation to perform any action that has at least one spatial component or requirement. In this example, an action to be performed by such an automated assembly can be determined 552. A current state of an environment in which that action is to be performed can also be determined, such as by analyzing image or sensor data as discussed above. An optimal or suitable location and orientation (or at least a location and orientation having a highest score, ranking, or confidence value) can be determined 554, from a set of possible locations and orientations, based at least in part upon a current state of this environment and the spatial component of the action to be performed. An optimal (highest ranked or scored) or suitable sequence of motions (or path of motion over a future period of time) can be predicted 556 or calculated to direct the assembly, or a relevant portion of the assembly, to the optimal or suitable location and orientation. As discussed above, predicting a sequence or future path of motion can help the resulting motion to be smoother and more intuitive, and can help the motion to better satisfy one or more constraints. Once determined, at least a first motion, or first subset of motions, can be caused 558 to be performed by this assembly. As mentioned, the motions to be made can be updated at each time step or for each change in state, for example, with only a current motion for the current time step being performed before the predicted sequence is potentially updated. A determination can be made 560 as to whether at least the relevant portion of the assembly has arrived at its target location and orientation, and if not then the process can continue for a next time step. If it is determined that at least the relevant portion of the robot has arrived at the target location and orientation, at least within an acceptable amount of deviation, then the robot can be caused 562 to perform the determined action at that location. As mentioned, such an approach can help to improve actions, such as human-to-robot handovers, by incorporating more knowledge about the robot motion planning problem—specifically using MPC to find smooth, consistent paths. Such an approach also allows various tasks to be reformulated as model predictive control problems. A learned reachability model can also be used which allows the model to prioritize positions where the robot has higher manipulability.

As discussed, various approaches presented herein can be lightweight enough to execute on a device such as a client device, such as a personal computer or gaming console, in real time. Such processing can be performed on content that is generated on, or received by, that client device or received from an external source, such as streaming sensor data or other content received over at least one network. In some instances, the processing and/or determination of this content may be performed by one of these other devices, systems, or entities, then provided to the client device (or another such recipient) for presentation or another such use.

Figure 6:
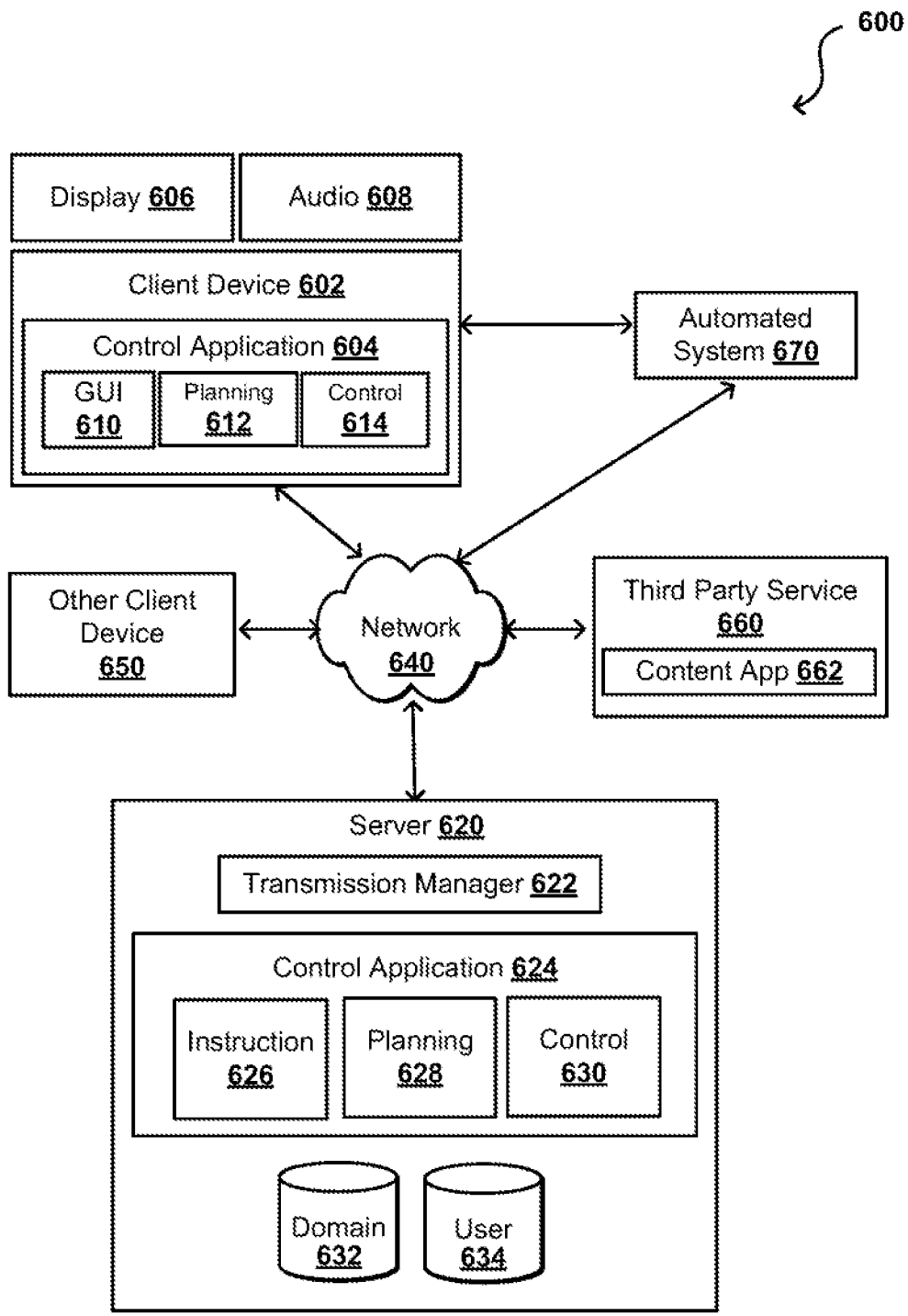
FIG. 6 illustrates components of a distributed system that can be used to cause a robot to perform one or more tasks, according to at least one embodiment.

As an example, FIG. 6 illustrates an example network configuration 600 that can be used to provide, generate, modify, encode, and/or transmit content. In at least one embodiment, a client device 602 can generate or receive data for a session using components of a control application 604 on client device 602 and data stored locally on that client device. In at least one embodiment, a control application 624 (e.g., an image generation or editing application) executing on control server 620 (e.g., a cloud server or edge server) may initiate a session associated with at least client device 602, as may use a session manager and user data stored in a user database 634, and can cause content 632 to be determined by a content manager 626. A control application 630 may obtain image data for a scene or environment, and work with an instruction module 626, planning module 628, control module 630, or other such component to generate a sequence of motions or accelerations to be performed by a robot or automated system 670 in that environment corresponding to that instruction. In this example, the content may relate to conditions about the environment, a sequence of discrete motions, machine-executable instructions, or other such data discussed or suggested herein. At least a portion of that content may be transmitted to client device 602 using an appropriate transmission manager 622 to send by download, streaming, or another such transmission channel. An encoder may be used to encode and/or compress at least some of this data before transmitting to the client device 602. In at least one embodiment, content may alternatively be provided to an automated system 670 for performance, with monitoring or instruction data coming from client device 602 and monitoring or status data being provided to client device 602, whether directly or across at least one network 640. In at least one embodiment, client device 602 receiving such content can provide this content to a corresponding control application 604, which may also or alternatively include a graphical user interface 610, planning module 612, and control module 614 or process. A decoder may also be used to decode data received over the network(s) 640 for presentation via client device 602, such as image or video content through a display 606 and audio, such as sounds and music, through at least one audio playback device 608, such as speakers or headphones. In at least one embodiment, at least some of this content may already be stored on, rendered on, or accessible to client device 602 such that transmission over network 640 is not required for at least that portion of content, such as where that content may have been previously downloaded or stored locally on a hard drive or optical disk. In at least one embodiment, a transmission mechanism such as data streaming can be used to transfer this content from server 620, or user database 634, to client device 602. In at least one embodiment, at least a portion of this content can be obtained or streamed from another source, such as a third party service 660 or other client device 650, that may also include a content application 662 for generating or providing content. In at least one embodiment, portions of this functionality can be performed using multiple computing devices, or multiple processors within one or more computing devices, such as may include a combination of CPUs and GPUs.

In this example, these client devices can include any appropriate computing devices, as may include a desktop computer, notebook computer, set-top box, streaming device, gaming console, smartphone, tablet computer, VR headset, AR goggles, wearable computer, or a smart television. Each client device can submit a request across at least one wired or wireless network, as may include the Internet, an Ethernet, a local area network (LAN), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

In at least one embodiment, such a system can be used for performing graphical rendering operations. In other embodiments, such a system can be used for other purposes, such as for providing image or video content to test or validate autonomous machine applications, or for performing deep learning operations. In at least one embodiment, such a system can be implemented using an edge device, or may incorporate one or more Virtual Machines (VMs). In at least one embodiment, such a system can be implemented at least partially in a data center or at least partially using cloud computing resources.

Inference and Training Logic

Figure 7A:
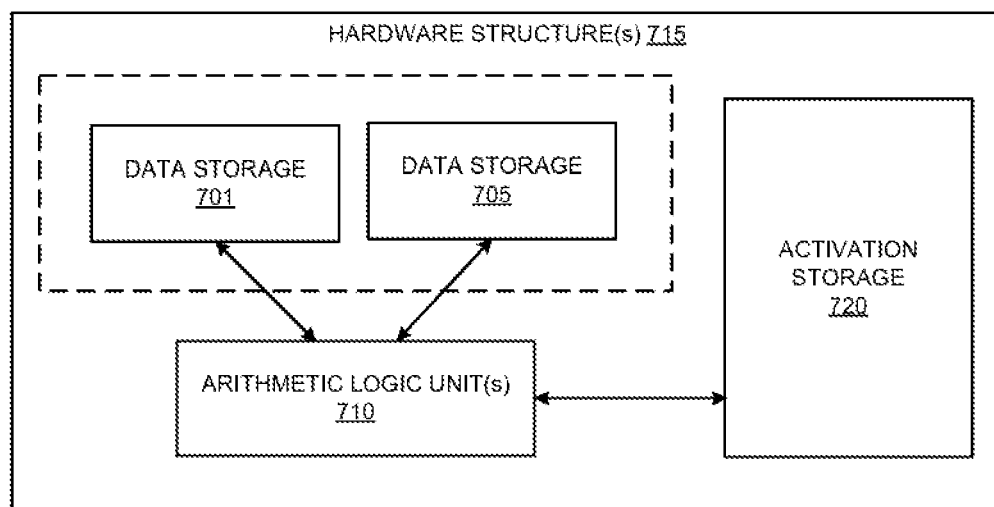
FIG. 7A illustrates inference and/or training logic, according to at least one embodiment.

FIG. 7A illustrates inference and/or training logic 715 used to perform inferencing and/or training operations associated with one or more embodiments. Details regarding inference and/or training logic 715 are provided below in conjunction with FIGS. 7A and/or 7B.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to on one or more processors or other hardware logic devices or circuits. In at least one embodiment, code and/or data storage 705 may be cache memory, DRAM, SRAM, non-volatile memory (e.g., Flash memory), or other storage. In at least one embodiment, choice of whether code and/or data storage 705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be same storage structure. In at least one embodiment, code and/or data storage 701 and code and/or data storage 705 may be partially same storage structure and partially separate storage structures. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or code and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALUs 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7a may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7a may be used in conjunction with central processing unit ("CPU") hardware, graphics processing unit ("GPU") hardware or other hardware, such as field programmable gate arrays ("FPGAs").

Figure 7B:
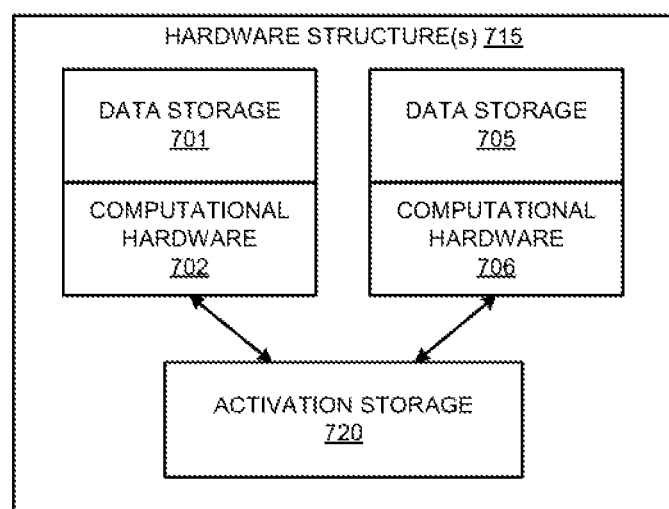
FIG. 7B illustrates inference and/or training logic, according to at least one embodiment.

FIG. 7b illustrates inference and/or training logic 715, according to at least one or more embodiments. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7b may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7b may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7b, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one "storage/computational pair 701/702" of code and/or data storage 701 and computational hardware 702 is provided as an input to "storage/computational pair 705/706" of code and/or data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Data Center

Figure 8:
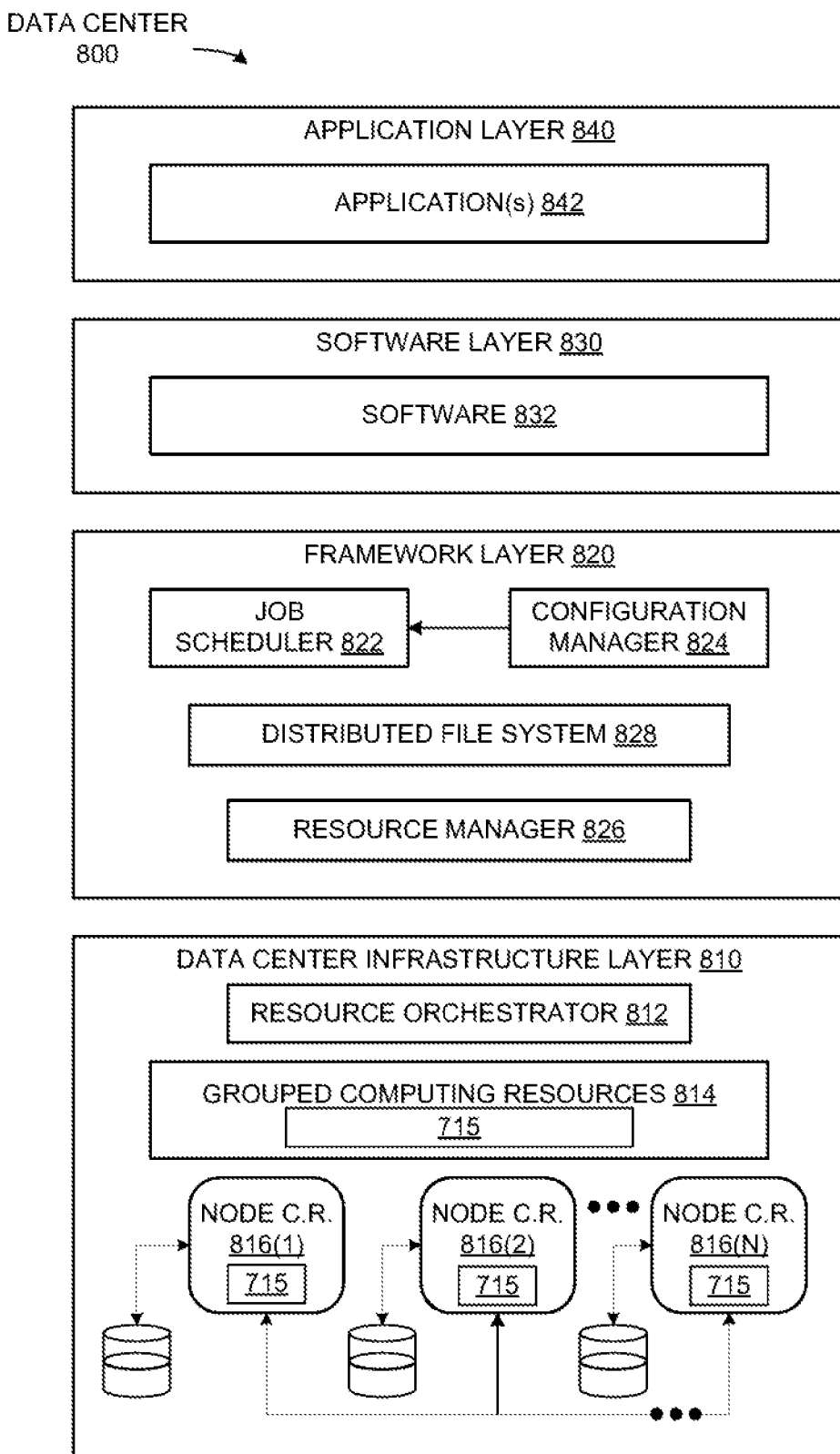
FIG. 8 illustrates an example data center system, according to at least one embodiment.

FIG. 8 illustrates an example data center 800, in which at least one embodiment may be used. In at least one embodiment, data center 800 includes a data center infrastructure layer 810, a framework layer 820, a software layer 830, and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator may include hardware, software or some combination thereof.

In at least one embodiment, as shown in FIG. 8, framework layer 820 includes a job scheduler 822, a configuration manager 824, a resource manager 826 and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may use distributed file system 828 for large-scale data processing (e.g., "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resource 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. The one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underused and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 8 for inferencing or predicting operations based, at least in part, on weight parameters calculated using neural network training operations, neural network functions and/or architectures, or neural network use cases described herein.

Such components can be used to determine and optimize motion for an automated system to perform a determined task.

Computer Systems

Figure 9:
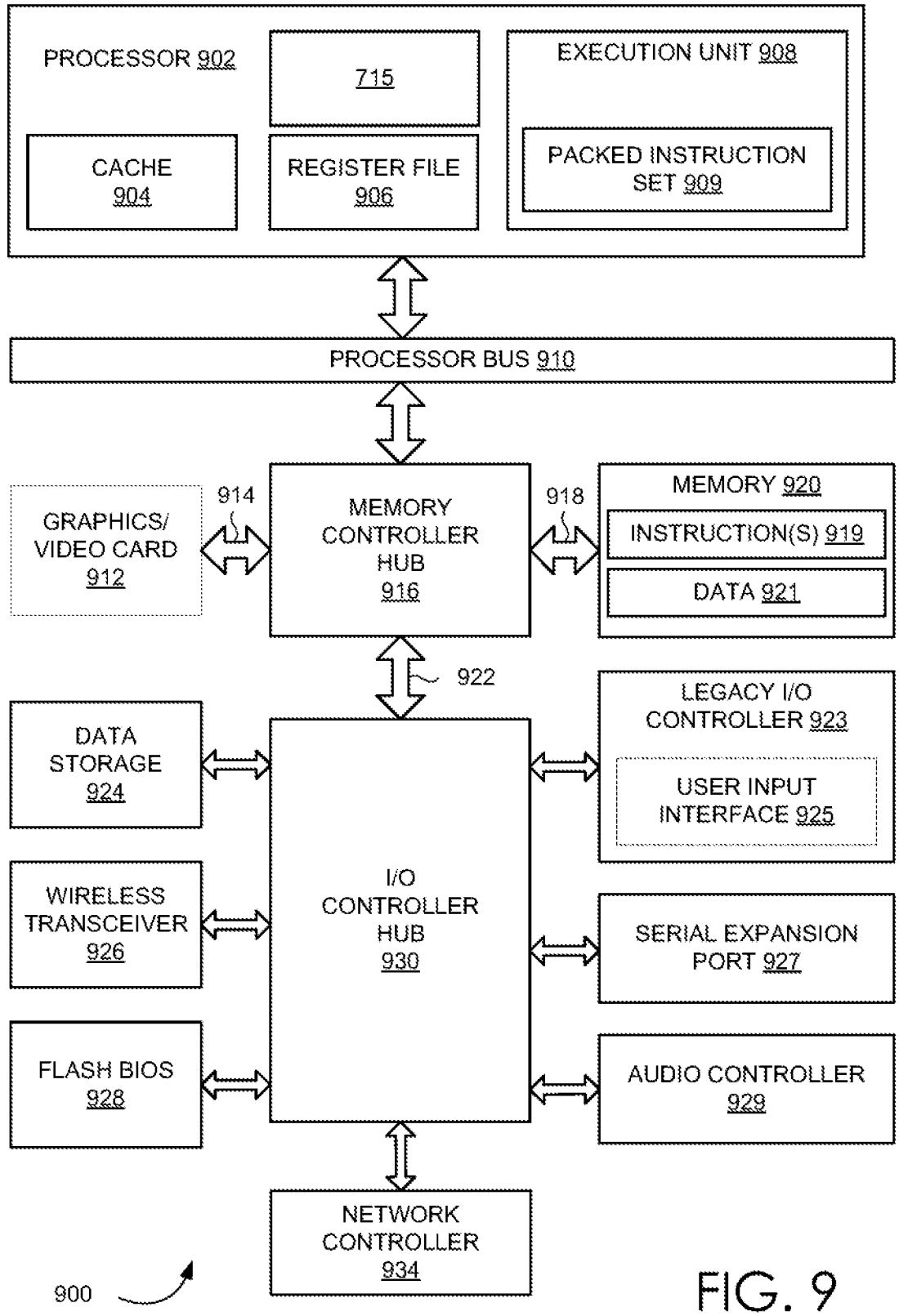
FIG. 9 illustrates a computer system, according to at least one embodiment.

FIG. 9 is a block diagram illustrating an exemplary computer system, which may be a system with interconnected devices and components, a system-on-a-chip (SOC) or some combination thereof 900 formed with a processor that may include execution units to execute an instruction, according to at least one embodiment. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, CA, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution units 908 to perform machine learning model training and/or inferencing according to techniques described herein. In at least one embodiment, computer system 900 is a single processor desktop or server system, but in another embodiment computer system 900 may be a multiprocessor system. In at least one embodiment, processor 902 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. Other embodiments may also include a combination of both internal and external caches depending on particular implementation and needs. In at least one embodiment, register file 906 may store different types of data in various registers including, without limitation, integer registers, floating point registers, status registers, and instruction pointer register.

In at least one embodiment, execution unit 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a Dynamic Random Access Memory ("DRAM") device, a Static Random Access Memory ("SRAM") device, flash memory device, or other memory device. In at least one embodiment, memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/O controller 923 containing user input and keyboard interfaces 925, a serial expansion port 927, such as Universal Serial Bus ("USB"), and a network controller 934. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 900 are interconnected using compute express link (CXL) interconnects.

Inference and/or training logic 715 are used to perform inferencing and/or training operations associated with one or more embodiments. Details regarding inference and/or training logic 715 are provided below in conjunction with FIGS. 7A and/or 7B. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein.

Such components can be used to determine and optimize motion for an automated system to perform a determined task.

Figure 10:
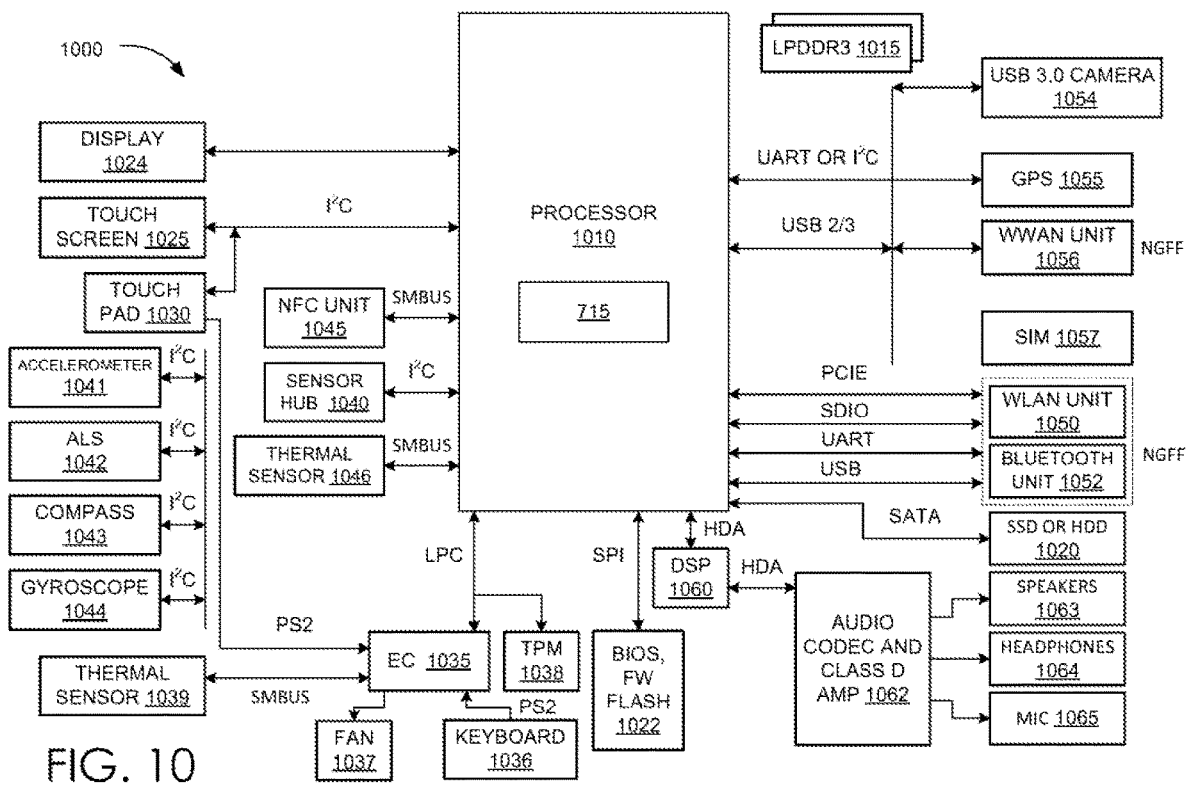
FIG. 10 illustrates a computer system, according to at least one embodiment.

FIG. 10 is a block diagram illustrating an electronic device 1000 for utilizing a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, system 1000 may include, without limitation, processor 1010 communicatively coupled to any suitable number or kind of components, peripherals, modules, or devices. In at least one embodiment, processor 1010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 10 illustrates a system, which includes interconnected hardware devices or "chips", whereas in other embodiments, FIG. 10 may illustrate an exemplary System on a Chip ("SoC"). In at least one embodiment, devices illustrated in FIG. 10 may be interconnected with proprietary interconnects, standardized interconnects (e.g., PCIe) or some combination thereof. In at least one embodiment, one or more components of FIG. 10 are interconnected using compute express link (CXL) interconnects.

In at least one embodiment, FIG. 10 may include a display 1024, a touch screen 1025, a touch pad 1030, a Near Field Communications unit ("NFC") 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network unit ("WLAN") 1050, a Bluetooth unit 1052, a Wireless Wide Area Network unit ("WWAN") 1056, a Global Positioning System (GPS) 1055, a camera ("USB 3.0 camera") 1054 such as a USB 3.0 camera, and/or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1046, and a touch pad 1030 may be communicatively coupled to EC 1035. In at least one embodiment, speaker 1063, headphones 1064, and microphone ("mic") 1065 may be communicatively coupled to an audio unit ("audio codec and class d amp") 1062, which may in turn be communicatively coupled to DSP 1060. In at least one embodiment, audio unit 1064 may include, for example and without limitation, an audio coder/decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Inference and/or training logic 715 are used to perform inferencing and/or training operations associated with one or more embodiments. Details regarding inference and/or training logic 715 are provided below in conjunction with FIGS. 7a and/or 7b. In at least one embodiment, inference and/or training logic 715 may be used in system FIG. 10 for inferencing or predicting operations based, at least in part, on weight parameters calculated using neural network training operations, neural network functions and/or architectures, or neural network use cases described herein.

Such components can be used to determine and optimize motion for an automated system to perform a determined task.

Figure 11:
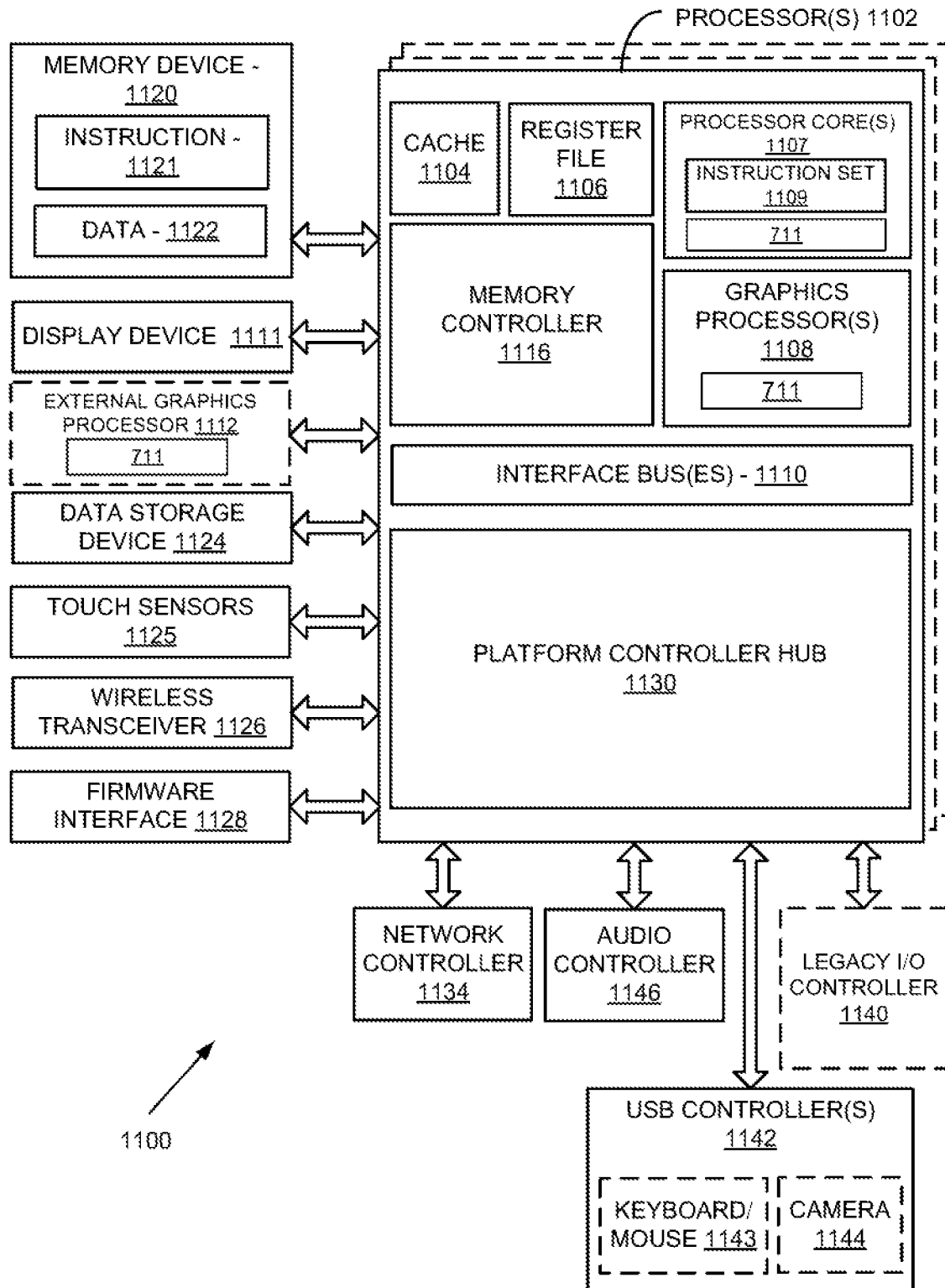
FIG. 11 illustrates at least portions of a graphics processor, according to one or more embodiments.

FIG. 11 is a block diagram of a processing system, according to at least one embodiment. In at least one embodiment, system 1100 includes one or more processors 1102 and one or more graphics processors 1108, and may be a single processor desktop system, a multiprocessor workstation system, or a server system having a large number of processors 1102 or processor cores 1107. In at least one embodiment, system 1100 is a processing platform incorporated within a system-on-a-chip (SoC) integrated circuit for use in mobile, handheld, or embedded devices.

In at least one embodiment, system 1100 can include, or be incorporated within a server-based gaming platform, a game console, including a game and media console, a mobile gaming console, a handheld game console, or an online game console. In at least one embodiment, system 1100 is a mobile phone, smart phone, tablet computing device or mobile Internet device. In at least one embodiment, processing system 1100 can also include, couple with, or be integrated within a wearable device, such as a smart watch wearable device, smart eyewear device, augmented reality device, or virtual reality device. In at least one embodiment, processing system 1100 is a television or set top box device having one or more processors 1102 and a graphical interface generated by one or more graphics processors 1108.

In at least one embodiment, one or more processors 1102 each include one or more processor cores 1107 to process instructions which, when executed, perform operations for system and user software. In at least one embodiment, each of one or more processor cores 1107 is configured to process a specific instruction set 1109. In at least one embodiment, instruction set 1109 may facilitate Complex Instruction Set Computing (CISC), Reduced Instruction Set Computing (RISC), or computing via a Very Long Instruction Word (VLIW). In at least one embodiment, processor cores 1107 may each process a different instruction set 1109, which may include instructions to facilitate emulation of other instruction sets. In at least one embodiment, processor core 1107 may also include other processing devices, such a Digital Signal Processor (DSP).

In at least one embodiment, processor 1102 includes cache memory 1104. In at least one embodiment, processor 1102 can have a single internal cache or multiple levels of internal cache. In at least one embodiment, cache memory is shared among various components of processor 1102. In at least one embodiment, processor 1102 also uses an external cache (e.g., a Level-3 (L3) cache or Last Level Cache (LLC)) (not shown), which may be shared among processor cores 1107 using known cache coherency techniques. In at least one embodiment, register file 1106 is additionally included in processor 1102 which may include different types of registers for storing different types of data (e.g., integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor 1102 and other components in system 1100. In at least one embodiment, interface bus 1110, in one embodiment, can be a processor bus, such as a version of a Direct Media Interface (DMI) bus. In at least one embodiment, interface 1110 is not limited to a DMI bus, and may include one or more Peripheral Component Interconnect buses (e.g., PCI, PCI Express), memory busses, or other types of interface busses. In at least one embodiment processor(s) 1102 include an integrated memory controller 1116 and a platform controller hub 1130. In at least one embodiment, memory controller 1116 facilitates communication between a memory device and other components of system 1100, while platform controller hub (PCH) 1130 provides connections to I/O devices via a local I/O bus.

In at least one embodiment, memory device 1120 can be a dynamic random access memory (DRAM) device, a static random access memory (SRAM) device, flash memory device, phase-change memory device, or some other memory device having suitable performance to serve as process memory. In at least one embodiment memory device 1120 can operate as system memory for system 1100, to store data 1122 and instructions 1121 for use when one or more processors 1102 executes an application or process. In at least one embodiment, memory controller 1116 also couples with an optional external graphics processor 1112, which may communicate with one or more graphics processors 1108 in processors 1102 to perform graphics and media operations. In at least one embodiment, a display device 1111 can connect to processor(s) 1102. In at least one embodiment display device 1111 can include one or more of an internal display device, as in a mobile electronic device or a laptop device or an external display device attached via a display interface (e.g., DisplayPort, etc.). In at least one embodiment, display device 1111 can include a head mounted display (HMD) such as a stereoscopic display device for use in virtual reality (VR) applications or augmented reality (AR) applications.

In at least one embodiment, platform controller hub 1130 allows peripherals to connect to memory device 1120 and processor 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). In at least one embodiment, data storage device 1124 can connect via a storage interface (e.g., SATA) or via a peripheral bus, such as a Peripheral Component Interconnect bus (e.g., PCI, PCI Express). In at least one embodiment, touch sensors 1125 can include touch screen sensors, pressure sensors, or fingerprint sensors. In at least one embodiment, wireless transceiver 1126 can be a Wi-Fi transceiver, a Bluetooth transceiver, or a mobile network transceiver such as a 3G, 4G, or Long Term Evolution (LTE) transceiver. In at least one embodiment, firmware interface 1128 allows communication with system firmware, and can be, for example, a unified extensible firmware interface (UEFI). In at least one embodiment, network controller 1134 can allow a network connection to a wired network. In at least one embodiment, a high-performance network controller (not shown) couples with interface bus 1110. In at least one embodiment, audio controller 1146 is a multi-channel high definition audio controller. In at least one embodiment, system 1100 includes an optional legacy I/O controller 1140 for coupling legacy (e.g., Personal System 2 (PS/2)) devices to system. In at least one embodiment, platform controller hub 1130 can also connect to one or more Universal Serial Bus (USB) controllers 1142 connect input devices, such as keyboard and mouse 1143 combinations, a camera 1144, or other USB input devices.

In at least one embodiment, an instance of memory controller 1116 and platform controller hub 1130 may be integrated into a discreet external graphics processor, such as external graphics processor 1112. In at least one embodiment, platform controller hub 1130 and/or memory controller 1116 may be external to one or more processor(s) 1102. For example, in at least one embodiment, system 1100 can include an external memory controller 1116 and platform controller hub 1130, which may be configured as a memory controller hub and peripheral controller hub within a system chipset that is in communication with processor(s) 1102.

Inference and/or training logic 715 are used to perform inferencing and/or training operations associated with one or more embodiments. Details regarding inference and/or training logic 715 are provided below in conjunction with FIGS. 7A and/or 7B. In at least one embodiment portions or all of inference and/or training logic 715 may be incorporated into graphics processor 1500. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIG. 7A or 7B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components can be used to determine and optimize motion for an automated system to perform a determined task.

Figure 12:
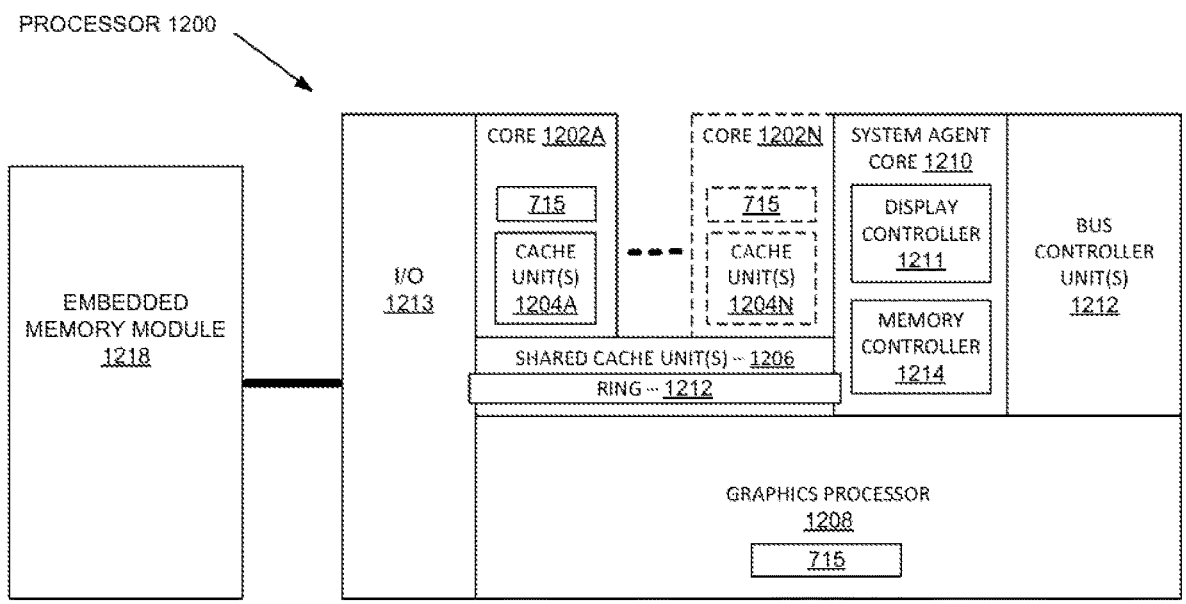
FIG. 12 illustrates at least portions of a graphics processor, according to one or more embodiments.

FIG. 12 is a block diagram of a processor 1200 having one or more processor cores 1202A-1202N, an integrated memory controller 1214, and an integrated graphics processor 1208, according to at least one embodiment. In at least one embodiment, processor 1200 can include additional cores up to and including additional core 1202N represented by dashed lined boxes. In at least one embodiment, each of processor cores 1202A-1202N includes one or more internal cache units 1204A-1204N. In at least one embodiment, each processor core also has access to one or more shared cached units 1206.

In at least one embodiment, internal cache units 1204A-1204N and shared cache units 1206 represent a cache memory hierarchy within processor 1200. In at least one embodiment, cache memory units 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1206 and 1204A-1204N.

In at least one embodiment, processor 1200 may also include a set of one or more bus controller units 1216 and a system agent core 1210. In at least one embodiment, one or more bus controller units 1216 manage a set of peripheral buses, such as one or more PCI or PCI express busses. In at least one embodiment, system agent core 1210 provides management functionality for various processor components. In at least one embodiment, system agent core 1210 includes one or more integrated memory controllers 1214 to manage access to various external memory devices (not shown).

In at least one embodiment, one or more of processor cores 1202A-1202N include support for simultaneous multi-threading. In at least one embodiment, system agent core 1210 includes components for coordinating and operating cores 1202A-1202N during multi-threaded processing. In at least one embodiment, system agent core 1210 may additionally include a power control unit (PCU), which includes logic and components to regulate one or more power states of processor cores 1202A-1202N and graphics processor 1208.

In at least one embodiment, processor 1200 additionally includes graphics processor 1208 to execute graphics processing operations. In at least one embodiment, graphics processor 1208 couples with shared cache units 1206, and system agent core 1210, including one or more integrated memory controllers 1214. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with ring interconnect 1212 via an I/O link 1213.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor cores 1202A-1202N and graphics processor 1208 use embedded memory modules 1218 as a shared Last Level Cache.

In at least one embodiment, processor cores 1202A-1202N are homogenous cores executing a common instruction set architecture. In at least one embodiment, processor cores 1202A-1202N are heterogeneous in terms of instruction set architecture (ISA), where one or more of processor cores 1202A-1202N execute a common instruction set, while one or more other cores of processor cores 1202A-1202N executes a subset of a common instruction set or a different instruction set. In at least one embodiment, processor cores 1202A-1202N are heterogeneous in terms of microarchitecture, where one or more cores having a relatively higher power consumption couple with one or more power cores having a lower power consumption. In at least one embodiment, processor 1200 can be implemented on one or more chips or as an SoC integrated circuit.

Inference and/or training logic 715 are used to perform inferencing and/or training operations associated with one or more embodiments. Details regarding inference and/or training logic 715 are provided below in conjunction with FIGS. 7a and/or 7b. In at least one embodiment portions or all of inference and/or training logic 715 may be incorporated into processor 1200. For example, in at least one embodiment, training and/or inferencing techniques described herein may use one or more of ALUs embodied in graphics processor 1512, graphics core(s) 1202A-1202N, or other components in FIG. 12. Moreover, in at least one embodiment, inferencing and/or training operations described herein may be done using logic other than logic illustrated in FIG. 7A or 7B. In at least one embodiment, weight parameters may be stored in on-chip or off-chip memory and/or registers (shown or not shown) that configure ALUs of graphics processor 1200 to perform one or more machine learning algorithms, neural network architectures, use cases, or training techniques described herein.

Such components can be used to determine and optimize motion for an automated system to perform a determined task.

Virtualized Computing Platform

Figure 13:
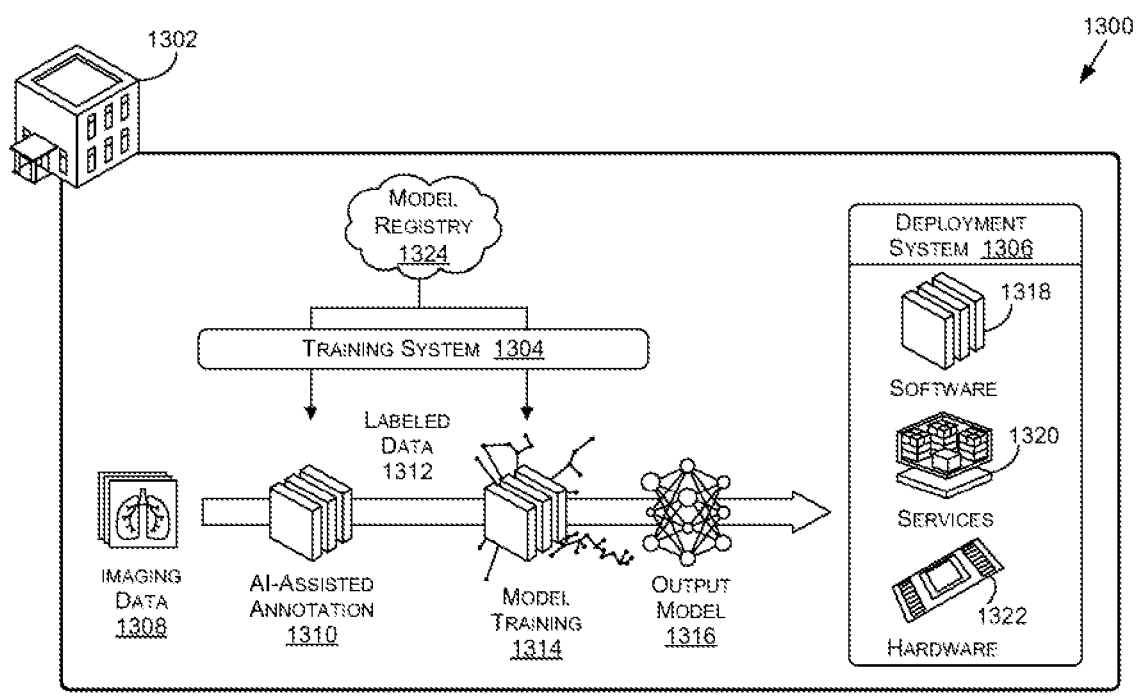
FIG. 13 is an example data flow diagram for an advanced computing pipeline, in accordance with at least one embodiment.

FIG. 13 is an example data flow diagram for a process 1300 of generating and deploying an image processing and inferencing pipeline, in accordance with at least one embodiment. In at least one embodiment, process 1300 may be deployed for use with imaging devices, processing devices, and/or other device types at one or more facilities 1302. Process 1300 may be executed within a training system 1304 and/or a deployment system 1306. In at least one embodiment, training system 1304 may be used to perform training, deployment, and implementation of machine learning models (e.g., neural networks, object detection algorithms, computer vision algorithms, etc.) for use in deployment system 1306. In at least one embodiment, deployment system 1306 may be configured to offload processing and compute resources among a distributed computing environment to reduce infrastructure requirements at facility 1302. In at least one embodiment, one or more applications in a pipeline may use or call upon services (e.g., inference, visualization, compute, AI, etc.) of deployment system 1306 during execution of applications.

In at least one embodiment, some of applications used in advanced processing and inferencing pipelines may use machine learning models or other AI to perform one or more processing steps. In at least one embodiment, machine learning models may be trained at facility 1302 using data 1308 (such as imaging data) generated at facility 1302 (and stored on one or more picture archiving and communication system (PACS) servers at facility 1302), may be trained using imaging or sequencing data 1308 from another facility(ies), or a combination thereof. In at least one embodiment, training system 1304 may be used to provide applications, services, and/or other resources for generating working, deployable machine learning models for deployment system 1306.

In at least one embodiment, model registry 1324 may be backed by object storage that may support versioning and object metadata. In at least one embodiment, object storage may be accessible through, for example, a cloud storage (e.g., cloud 1426 of FIG. 14) compatible application programming interface (API) from within a cloud platform. In at least one embodiment, machine learning models within model registry 1324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1404 (FIG. 14) may include a scenario where facility 1302 is training their own machine learning model, or has an existing machine learning model that needs to be optimized or updated. In at least one embodiment, imaging data 1308 generated by imaging device(s), sequencing devices, and/or other device types may be received. In at least one embodiment, once imaging data 1308 is received, AI-assisted annotation 1310 may be used to aid in generating annotations corresponding to imaging data 1308 to be used as ground truth data for a machine learning model. In at least one embodiment, AI-assisted annotation 1310 may include one or more machine learning models (e.g., convolutional neural networks (CNNs)) that may be trained to generate annotations corresponding to certain types of imaging data 1308 (e.g., from certain devices). In at least one embodiment, AI-assisted annotations 1310 may then be used directly, or may be adjusted or fine-tuned using an annotation tool to generate ground truth data. In at least one embodiment, AI-assisted annotations 1310, labeled clinic data 1312, or a combination thereof may be used as ground truth data for training a machine learning model. In at least one embodiment, a trained machine learning model may be referred to as output model 1316, and may be used by deployment system 1306, as described herein.

In at least one embodiment, training pipeline 1404 (FIG. 14) may include a scenario where facility 1302 needs a machine learning model for use in performing one or more processing tasks for one or more applications in deployment system 1306, but facility 1302 may not currently have such a machine learning model (or may not have a model that is optimized, efficient, or effective for such purposes). In at least one embodiment, an existing machine learning model may be selected from a model registry 1324. In at least one embodiment, model registry 1324 may include machine learning models trained to perform a variety of different inference tasks on imaging data. In at least one embodiment, machine learning models in model registry 1324 may have been trained on imaging data from different facilities than facility 1302 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1324. In at least one embodiment, a machine learning model may then be retrained, or updated, at any number of other facilities, and a retrained or updated model may be made available in model registry 1324. In at least one embodiment, a machine learning model may then be selected from model registry 1324—and referred to as output model 1316—and may be used in deployment system 1306 to perform one or more processing tasks for one or more applications of a deployment system.

In at least one embodiment, training pipeline 1404 (FIG. 14), a scenario may include facility 1302 requiring a machine learning model for use in performing one or more processing tasks for one or more applications in deployment system 1306, but facility 1302 may not currently have such a machine learning model (or may not have a model that is optimized, efficient, or effective for such purposes). In at least one embodiment, a machine learning model selected from model registry 1324 may not be fine-tuned or optimized for imaging data 1308 generated at facility 1302 because of differences in populations, robustness of training data used to train a machine learning model, diversity in anomalies of training data, and/or other issues with training data. In at least one embodiment, AI-assisted annotation 1310 may be used to aid in generating annotations corresponding to imaging data 1308 to be used as ground truth data for retraining or updating a machine learning model. In at least one embodiment, labeled data 1312 may be used as ground truth data for training a machine learning model. In at least one embodiment, retraining or updating a machine learning model may be referred to as model training 1314. In at least one embodiment, model training 1314—e.g., AI-assisted annotations 1310, labeled clinic data 1312, or a combination thereof—may be used as ground truth data for retraining or updating a machine learning model. In at least one embodiment, a trained machine learning model may be referred to as output model 1316, and may be used by deployment system 1306, as described herein.

In at least one embodiment, deployment system 1306 may include software 1318, services 1320, hardware 1322, and/or other components, features, and functionality. In at least one embodiment, deployment system 1306 may include a software "stack," such that software 1318 may be built on top of services 1320 and may use services 1320 to perform some or all of processing tasks, and services 1320 and software 1318 may be built on top of hardware 1322 and use hardware 1322 to execute processing, storage, and/or other compute tasks of deployment system 1306. In at least one embodiment, software 1318 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1308, in addition to containers that receive and configure imaging data for use by each container and/or for use by facility 1302 after processing through a pipeline (e.g., to convert outputs back to a usable data type). In at least one embodiment, a combination of containers within software 1318 (e.g., that make up a pipeline) may be referred to as a virtual instrument (as described in more detail herein), and a virtual instrument may leverage services 1320 and hardware 1322 to execute some or all processing tasks of applications instantiated in containers.

In at least one embodiment, a data processing pipeline may receive input data (e.g., imaging data 1308) in a specific format in response to an inference request (e.g., a request from a user of deployment system 1306). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1316 of training system 1304.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1324 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1320 as a system (e.g., system 1400 of FIG. 14). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1400 (e.g., for accuracy), an application may be available in a container registry for selection and/or implementation by a user to perform one or more processing tasks with respect to data at a facility (e.g., a second facility) of a user.

Figure 14:
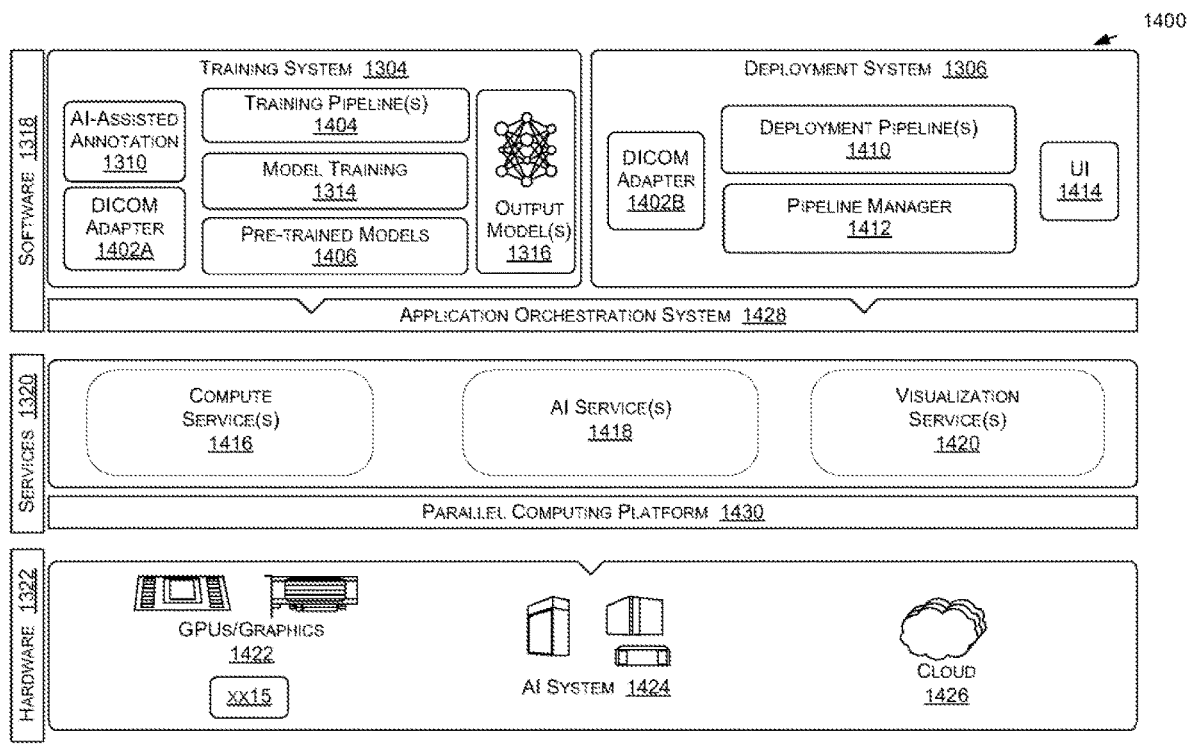
FIG. 14 is a system diagram for an example system for training, adapting, instantiating and deploying machine learning models in an advanced computing pipeline, in accordance with at least one embodiment.

In at least one embodiment, developers may then share applications or containers through a network for access and use by users of a system (e.g., system 1400 of FIG. 14). In at least one embodiment, completed and validated applications or containers may be stored in a container registry and associated machine learning models may be stored in model registry 1324. In at least one embodiment, a requesting entity—who provides an inference or image processing request—may browse a container registry and/or model registry 1324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1306 (e.g., a cloud) to perform processing of data processing pipeline. In at least one embodiment, processing by deployment system 1306 may include referencing selected elements (e.g., applications, containers, models, etc.) from a container registry and/or model registry 1324. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1320 may be leveraged. In at least one embodiment, services 1320 may include compute services, artificial intelligence (AI) services, visualization services, and/or other service types. In at least one embodiment, services 1320 may provide functionality that is common to one or more applications in software 1318, so functionality may be abstracted to a service that may be called upon or leveraged by applications. In at least one embodiment, functionality provided by services 1320 may run dynamically and more efficiently, while also scaling well by allowing applications to process data in parallel (e.g., using a parallel computing platform 1430 (FIG. 14)). In at least one embodiment, rather than each application that shares a same functionality offered by a service 1320 being required to have a respective instance of service 1320, service 1320 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc. —to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1320 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1318 implementing advanced processing and inferencing pipeline that includes segmentation application and anomaly detection application may be streamlined because each application may call upon a same inference service to perform one or more inferencing tasks.

In at least one embodiment, hardware 1322 may include GPUs, CPUs, graphics cards, an AI/deep learning system (e.g., an AI supercomputer, such as NVIDIA's DGX), a cloud platform, or a combination thereof. In at least one embodiment, different types of hardware 1322 may be used to provide efficient, purpose-built support for software 1318 and services 1320 in deployment system 1306. In at least one embodiment, use of GPU processing may be implemented for processing locally (e.g., at facility 1302), within an AI/deep learning system, in a cloud system, and/or in other processing components of deployment system 1306 to improve efficiency, accuracy, and efficacy of image processing and generation. In at least one embodiment, software 1318 and/or services 1320 may be optimized for GPU processing with respect to deep learning, machine learning, and/or high-performance computing, as non-limiting examples. In at least one embodiment, at least some of computing environment of deployment system 1306 and/or training system 1304 may be executed in a datacenter one or more supercomputers or high performance computing systems, with GPU optimized software (e.g., hardware and software combination of NVIDIA's DGX System). In at least one embodiment, hardware 1322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to allow seamless scaling and load balancing.

FIG. 14 is a system diagram for an example system 1400 for generating and deploying an imaging deployment pipeline, in accordance with at least one embodiment. In at least one embodiment, system 1400 may be used to implement process 1300 of FIG. 13 and/or other processes including advanced processing and inferencing pipelines. In at least one embodiment, system 1400 may include training system 1304 and deployment system 1306. In at least one embodiment, training system 1304 and deployment system 1306 may be implemented using software 1318, services 1320, and/or hardware 1322, as described herein.

In at least one embodiment, system 1400 (e.g., training system 1304 and/or deployment system 1306) may implemented in a cloud computing environment (e.g., using cloud 1426). In at least one embodiment, system 1400 may be implemented locally with respect to a healthcare services facility, or as a combination of both cloud and local computing resources. In at least one embodiment, access to APIs in cloud 1426 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1400, may be restricted to a set of public IPs that have been vetted or authorized for interaction.

In at least one embodiment, various components of system 1400 may communicate between and among one another using any of a variety of different network types, including but not limited to local area networks (LANs) and/or wide area networks (WANs) via wired and/or wireless communication protocols. In at least one embodiment, communication between facilities and components of system 1400 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1304 may execute training pipelines 1404, similar to those described herein with respect to FIG. 13. In at least one embodiment, where one or more machine learning models are to be used in deployment pipelines 1410 by deployment system 1306, training pipelines 1404 may be used to train or retrain one or more (e.g. pre-trained) models, and/or implement one or more of pre-trained models 1406 (e.g., without a need for retraining or updating). In at least one embodiment, as a result of training pipelines 1404, output model(s) 1316 may be generated. In at least one embodiment, training pipelines 1404 may include any number of processing steps, such as but not limited to imaging data (or other input data) conversion or adaption In at least one embodiment, for different machine learning models used by deployment system 1306, different training pipelines 1404 may be used. In at least one embodiment, training pipeline 1404 similar to a first example described with respect to FIG. 13 may be used for a first machine learning model, training pipeline 1404 similar to a second example described with respect to FIG. 13 may be used for a second machine learning model, and training pipeline 1404 similar to a third example described with respect to FIG. 13 may be used for a third machine learning model. In at least one embodiment, any combination of tasks within training system 1304 may be used depending on what is required for each respective machine learning model. In at least one embodiment, one or more of machine learning models may already be trained and ready for deployment so machine learning models may not undergo any processing by training system 1304, and may be implemented by deployment system 1306.

In at least one embodiment, output model(s) 1316 and/or pre-trained model(s) 1406 may include any types of machine learning models depending on implementation or embodiment. In at least one embodiment, and without limitation, machine learning models used by system 1400 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

Figure 15A:
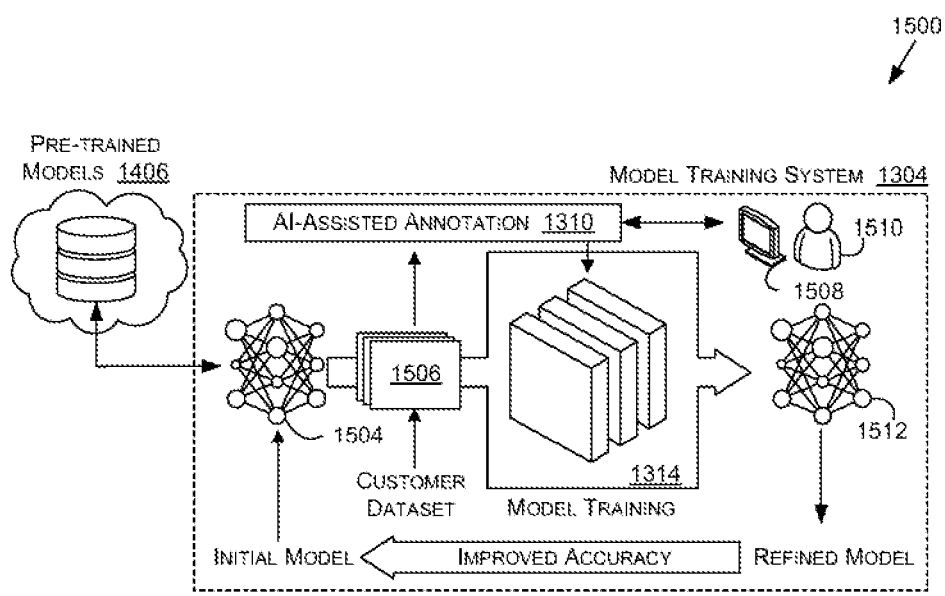
FIGS. 15A and 15B illustrate a data flow diagram for a process to train a machine learning model, as well as client-server architecture to enhance annotation tools with pre-trained annotation models, in accordance with at least one embodiment.
Figure 15B:
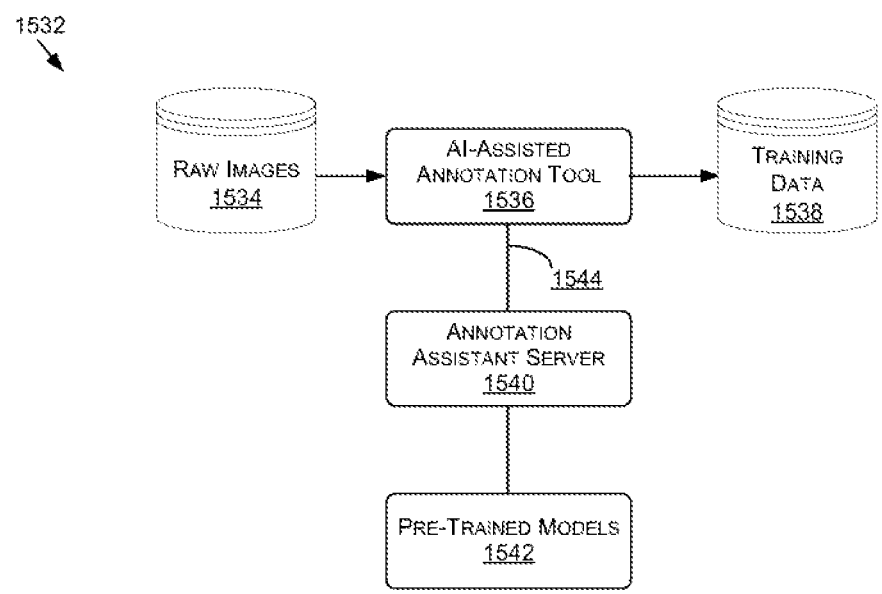

In at least one embodiment, training pipelines 1404 may include AI-assisted annotation, as described in more detail herein with respect to at least FIG. 15B. In at least one embodiment, labeled data 1312 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1308 (or other data type used by machine learning models), there may be corresponding ground truth data generated by training system 1304. In at least one embodiment, AI-assisted annotation may be performed as part of deployment pipelines 1410; either in addition to, or in lieu of AI-assisted annotation included in training pipelines 1404. In at least one embodiment, system 1400 may include a multi-layer platform that may include a software layer (e.g., software 1318) of diagnostic applications (or other application types) that may perform one or more medical imaging and diagnostic functions. In at least one embodiment, system 1400 may be communicatively coupled to (e.g., via encrypted links) PACS server networks of one or more facilities. In at least one embodiment, system 1400 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1302). In at least one embodiment, applications may then call or execute one or more services 1320 for performing compute, AI, or visualization tasks associated with respective applications, and software 1318 and/or services 1320 may leverage hardware 1322 to perform processing tasks in an effective and efficient manner.

In at least one embodiment, deployment system 1306 may execute deployment pipelines 1410. In at least one embodiment, deployment pipelines 1410 may include any number of applications that may be sequentially, non-sequentially, or otherwise applied to imaging data (and/or other data types) generated by imaging devices, sequencing devices, genomics devices, etc. —including AI-assisted annotation, as described above. In at least one embodiment, as described herein, a deployment pipeline 1410 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1410 depending on information desired from data generated by a device. In at least one embodiment, where detections of anomalies are desired from an Mill machine, there may be a first deployment pipeline 1410, and where image enhancement is desired from output of an Mill machine, there may be a second deployment pipeline 1410.

In at least one embodiment, an image generation application may include a processing task that includes use of a machine learning model. In at least one embodiment, a user may desire to use their own machine learning model, or to select a machine learning model from model registry 1324. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1400—such as services 1320 and hardware 1322—deployment pipelines 1410 may be even more user friendly, provide for easier integration, and produce more accurate, efficient, and timely results.

In at least one embodiment, deployment system 1306 may include a user interface 1414 (e.g., a graphical user interface, a web interface, etc.) that may be used to select applications for inclusion in deployment pipeline(s) 1410, arrange applications, modify or change applications or parameters or constructs thereof, use and interact with deployment pipeline(s) 1410 during set-up and/or deployment, and/or to otherwise interact with deployment system 1306. In at least one embodiment, although not illustrated with respect to training system 1304, user interface 1414 (or a different user interface) may be used for selecting models for use in deployment system 1306, for selecting models for training, or retraining, in training system 1304, and/or for otherwise interacting with training system 1304.

In at least one embodiment, pipeline manager 1412 may be used, in addition to an application orchestration system 1428, to manage interaction between applications or containers of deployment pipeline(s) 1410 and services 1320 and/or hardware 1322. In at least one embodiment, pipeline manager 1412 may be configured to facilitate interactions from application to application, from application to service 1320, and/or from application or service to hardware 1322. In at least one embodiment, although illustrated as included in software 1318, this is not intended to be limiting, and in some examples (e.g., as illustrated in FIG. 12cc) pipeline manager 1412 may be included in services 1320. In at least one embodiment, application orchestration system 1428 (e.g., Kubernetes, DOCKER, etc.) may include a container orchestration system that may group applications into containers as logical units for coordination, management, scaling, and deployment. In at least one embodiment, by associating applications from deployment pipeline(s) 1410 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1412 and application orchestration system 1428. In at least one embodiment, so long as an expected input and/or output of each container or application is known by a system (e.g., based on constructs of applications or containers), application orchestration system 1428 and/or pipeline manager 1412 may facilitate communication among and between, and sharing of resources among and between, each of applications or containers. In at least one embodiment, because one or more of applications or containers in deployment pipeline(s) 1410 may share same services and resources, application orchestration system 1428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1428) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1320 leveraged by and shared by applications or containers in deployment system 1306 may include compute services 1416, AI services 1418, visualization services 1420, and/or other service types. In at least one embodiment, applications may call (e.g., execute) one or more of services 1320 to perform processing operations for an application. In at least one embodiment, compute services 1416 may be leveraged by applications to perform super-computing or other high-performance computing (HPC) tasks. In at least one embodiment, compute service(s) 1416 may be leveraged to perform parallel processing (e.g., using a parallel computing platform 1430) for processing data through one or more of applications and/or one or more tasks of a single application, substantially simultaneously. In at least one embodiment, parallel computing platform 1430 (e.g., NVIDIA's CUDA) may allow general purpose computing on GPUs (GPGPU) (e.g., GPUs 1422). In at least one embodiment, a software layer of parallel computing platform 1430 may provide access to virtual instruction sets and parallel computational elements of GPUs, for execution of compute kernels. In at least one embodiment, parallel computing platform 1430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1430 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1418 may be leveraged to perform inferencing services for executing machine learning model(s) associated with applications (e.g., tasked with performing one or more processing tasks of an application). In at least one embodiment, AI services 1418 may leverage AI system 1424 to execute machine learning model(s) (e.g., neural networks, such as CNNs) for segmentation, reconstruction, object detection, feature detection, classification, and/or other inferencing tasks. In at least one embodiment, applications of deployment pipeline(s) 1410 may use one or more of output models 1316 from training system 1304 and/or other models of applications to perform inference on imaging data. In at least one embodiment, two or more examples of inferencing using application orchestration system 1428 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1428 may distribute resources (e.g., services 1320 and/or hardware 1322) based on priority paths for different inferencing tasks of AI services 1418.

In at least one embodiment, shared storage may be mounted to AI services 1418 within system 1400. In at least one embodiment, shared storage may operate as a cache (or other storage device type) and may be used to process inference requests from applications. In at least one embodiment, when an inference request is submitted, a request may be received by a set of API instances of deployment system 1306, and one or more instances may be selected (e.g., for best fit, for load balancing, etc.) to process a request. In at least one embodiment, to process a request, a request may be entered into a database, a machine learning model may be located from model registry 1324 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1412) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<10 min). In at least one embodiment, model execution times may be measured from requesting institution or entity and may include partner network traversal time, as well as execution on an inference service.

In at least one embodiment, transfer of requests between services 1320 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1426, and an inference service may perform inferencing on a GPU.

In at least one embodiment, visualization services 1420 may be leveraged to generate visualizations for viewing outputs of applications and/or deployment pipeline(s) 1410. In at least one embodiment, GPUs 1422 may be leveraged by visualization services 1420 to generate visualizations. In at least one embodiment, rendering effects, such as ray-tracing, may be implemented by visualization services 1420 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1420 may include an internal visualizer, cinematics, and/or other rendering or image processing capabilities or functionality (e.g., ray tracing, rasterization, internal optics, etc.).

In at least one embodiment, hardware 1322 may include GPUs 1422, AI system 1424, cloud 1426, and/or any other hardware used for executing training system 1304 and/or deployment system 1306. In at least one embodiment, GPUs 1422 (e.g., NVIDIA's TESLA and/or QUADRO GPUs) may include any number of GPUs that may be used for executing processing tasks of compute services 1416, AI services 1418, visualization services 1420, other services, and/or any of features or functionality of software 1318. For example, with respect to AI services 1418, GPUs 1422 may be used to perform pre-processing on imaging data (or other data types used by machine learning models), post-processing on outputs of machine learning models, and/or to perform inferencing (e.g., to execute machine learning models). In at least one embodiment, cloud 1426, AI system 1424, and/or other components of system 1400 may use GPUs 1422. In at least one embodiment, cloud 1426 may include a GPU-optimized platform for deep learning tasks. In at least one embodiment, AI system 1424 may use GPUs, and cloud 1426—or at least a portion tasked with deep learning or inferencing—may be executed using one or more AI systems 1424. As such, although hardware 1322 is illustrated as discrete components, this is not intended to be limiting, and any components of hardware 1322 may be combined with, or leveraged by, any other components of hardware 1322.

In at least one embodiment, AI system 1424 may include a purpose-built computing system (e.g., a super-computer or an HPC) configured for inferencing, deep learning, machine learning, and/or other artificial intelligence tasks. In at least one embodiment, AI system 1424 (e.g., NVIDIA's DGX) may include GPU-optimized software (e.g., a software stack) that may be executed using a plurality of GPUs 1422, in addition to CPUs, RAM, storage, and/or other components, features, or functionality. In at least one embodiment, one or more AI systems 1424 may be implemented in cloud 1426 (e.g., in a data center) for performing some or all of AI-based processing tasks of system 1400.

In at least one embodiment, cloud 1426 may include a GPU-accelerated infrastructure (e.g., NVIDIA's NGC) that may provide a GPU-optimized platform for executing processing tasks of system 1400. In at least one embodiment, cloud 1426 may include an AI system(s) 1424 for performing one or more of AI-based tasks of system 1400 (e.g., as a hardware abstraction and scaling platform). In at least one embodiment, cloud 1426 may integrate with application orchestration system 1428 leveraging multiple GPUs to allow seamless scaling and load balancing between and among applications and services 1320. In at least one embodiment, cloud 1426 may tasked with executing at least some of services 1320 of system 1400, including compute services 1416, AI services 1418, and/or visualization services 1420, as described herein. In at least one embodiment, cloud 1426 may perform small and large batch inference (e.g., executing NVIDIA's TENSOR RT), provide an accelerated parallel computing API and platform 1430 (e.g., NVIDIA's CUDA), execute application orchestration system 1428 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1400.

FIG. 15A illustrates a data flow diagram for a process 1500 to train, retrain, or update a machine learning model, in accordance with at least one embodiment. In at least one embodiment, process 1500 may be executed using, as a non-limiting example, system 1400 of FIG. 14. In at least one embodiment, process 1500 may leverage services 1320 and/or hardware 1322 of system 1400, as described herein. In at least one embodiment, refined models 1512 generated by process 1500 may be executed by deployment system 1306 for one or more containerized applications in deployment pipelines 1410.

In at least one embodiment, model training 1314 may include retraining or updating an initial model 1504 (e.g., a pre-trained model) using new training data (e.g., new input data, such as customer dataset 1506, and/or new ground truth data associated with input data). In at least one embodiment, to retrain, or update, initial model 1504, output or loss layer(s) of initial model 1504 may be reset, or deleted, and/or replaced with an updated or new output or loss layer(s). In at least one embodiment, initial model 1504 may have previously fine-tuned parameters (e.g., weights and/or biases) that remain from prior training, so training or retraining 1314 may not take as long or require as much processing as training a model from scratch. In at least one embodiment, during model training 1314, by having reset or replaced output or loss layer(s) of initial model 1504, parameters may be updated and re-tuned for a new data set based on loss calculations associated with accuracy of output or loss layer(s) at generating predictions on new, customer dataset 1506 (e.g., image data 1308 of FIG. 13).

In at least one embodiment, pre-trained models 1406 may be stored in a data store, or registry (e.g., model registry 1324 of FIG. 13). In at least one embodiment, pre-trained models 1406 may have been trained, at least in part, at one or more facilities other than a facility executing process 1500. In at least one embodiment, to protect privacy and rights of patients, subjects, or clients of different facilities, pre-trained models 1406 may have been trained, on-premise, using customer or patient data generated on-premise. In at least one embodiment, pre-trained models 1406 may be trained using cloud 1426 and/or other hardware 1322, but confidential, privacy protected patient data may not be transferred to, used by, or accessible to any components of cloud 1426 (or other off premise hardware). In at least one embodiment, where a pre-trained model 1406 is trained at using patient data from more than one facility, pre-trained model 1406 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1406 on-premise and/or off premise, such as in a datacenter or other cloud computing infrastructure.

In at least one embodiment, when selecting applications for use in deployment pipelines 1410, a user may also select machine learning models to be used for specific applications. In at least one embodiment, a user may not have a model for use, so a user may select a pre-trained model 1406 to use with an application. In at least one embodiment, pre-trained model 1406 may not be optimized for generating accurate results on customer dataset 1506 of a facility of a user (e.g., based on patient diversity, demographics, types of medical imaging devices used, etc.). In at least one embodiment, prior to deploying pre-trained model 1406 into deployment pipeline 1410 for use with an application(s), pre-trained model 1406 may be updated, retrained, and/or fine-tuned for use at a respective facility.

In at least one embodiment, a user may select pre-trained model 1406 that is to be updated, retrained, and/or fine-tuned, and pre-trained model 1406 may be referred to as initial model 1504 for training system 1304 within process 1500. In at least one embodiment, customer dataset 1506 (e.g., imaging data, genomics data, sequencing data, or other data types generated by devices at a facility) may be used to perform model training 1314 (which may include, without limitation, transfer learning) on initial model 1504 to generate refined model 1512. In at least one embodiment, ground truth data corresponding to customer dataset 1506 may be generated by training system 1304. In at least one embodiment, ground truth data may be generated, at least in part, by clinicians, scientists, doctors, practitioners, at a facility (e.g., as labeled clinic data 1312 of FIG. 13).

In at least one embodiment, AI-assisted annotation 1310 may be used in some examples to generate ground truth data. In at least one embodiment, AI-assisted annotation 1310 (e.g., implemented using an AI-assisted annotation SDK) may leverage machine learning models (e.g., neural networks) to generate suggested or predicted ground truth data for a customer dataset. In at least one embodiment, user 1510 may use annotation tools within a user interface (a graphical user interface (GUI)) on computing device 1508.

In at least one embodiment, user 1510 may interact with a GUI via computing device 1508 to edit or fine-tune (auto)annotations. In at least one embodiment, a polygon editing feature may be used to move vertices of a polygon to more accurate or fine-tuned locations.

In at least one embodiment, once customer dataset 1506 has associated ground truth data, ground truth data (e.g., from AI-assisted annotation, manual labeling, etc.) may be used by during model training 1314 to generate refined model 1512. In at least one embodiment, customer dataset 1506 may be applied to initial model 1504 any number of times, and ground truth data may be used to update parameters of initial model 1504 until an acceptable level of accuracy is attained for refined model 1512. In at least one embodiment, once refined model 1512 is generated, refined model 1512 may be deployed within one or more deployment pipelines 1410 at a facility for performing one or more processing tasks with respect to medical imaging data.

In at least one embodiment, refined model 1512 may be uploaded to pre-trained models 1406 in model registry 1324 to be selected by another facility. In at least one embodiment, his process may be completed at any number of facilities such that refined model 1512 may be further refined on new datasets any number of times to generate a more universal model.

FIG. 15B is an example illustration of a client-server architecture 1532 to enhance annotation tools with pre-trained annotation models, in accordance with at least one embodiment. In at least one embodiment, AI-assisted annotation tools 1536 may be instantiated based on a client-server architecture 1532. In at least one embodiment, annotation tools 1536 in imaging applications may aid radiologists, for example, identify organs and abnormalities. In at least one embodiment, imaging applications may include software tools that help user 1510 to identify, as a non-limiting example, a few extreme points on a particular organ of interest in raw images 1534 (e.g., in a 3D MRI or CT scan) and receive auto-annotated results for all 2D slices of a particular organ. In at least one embodiment, results may be stored in a data store as training data 1538 and used as (for example and without limitation) ground truth data for training. In at least one embodiment, when computing device 1508 sends extreme points for AI-assisted annotation 1310, a deep learning model, for example, may receive this data as input and return inference results of a segmented organ or abnormality. In at least one embodiment, pre-instantiated annotation tools, such as AI-Assisted Annotation Tool 1536B in FIG. 15B, may be enhanced by making API calls (e.g., API Call 1544) to a server, such as an Annotation Assistant Server 1540 that may include a set of pre-trained models 1542 stored in an annotation model registry, for example. In at least one embodiment, an annotation model registry may store pre-trained models 1542 (e.g., machine learning models, such as deep learning models) that are pre-trained to perform AI-assisted annotation on a particular organ or abnormality. These models may be further updated by using training pipelines 1404. In at least one embodiment, pre-installed annotation tools may be improved over time as new labeled clinic data 1312 is added.

Such components can be used to determine and optimize motion for an automated system to perform a determined task.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (e.g., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that allow performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method, comprising:
receiving data representative of an environment, the environment including an object held by a human hand;
determining, based at least in part on evaluating one or more potential grasp options corresponding to a robot, a target grasp option from the one or more potential grasp options;
determining a sequence of motions between an initial position and a final position corresponding to the robot according to the target grasp option, the sequence of motions being determined based at least in part on minimizing one or more cost functions and satisfying one or more motion constraints;
causing, at individual time steps corresponding to one or more motions of the sequence of motions, the robot to perform a respective motion of the sequence of motions;
detecting contact of the robot with the object corresponding to the target grasp position; and
causing an end-effector of the robot to grasp the object.

2. The method of claim 1, wherein the one or more motion constraints include at least one of a constraint to favor smooth motion, a constraint to limit acceleration, a constraint to favor straight line motion, a constraint to avoid a collision, a constraint to avoid a self-collision, or a constraint to avoid an occlusion of a sensor used to capture the data.

3. The method of claim 1, wherein the determining the sequence of motions comprises using a model predictive control (MPC) system to execute at least one optimization algorithm with the one or more motion constraints.

4. The method of claim 3, wherein the determining the target grasp option is executed using the MPC system.

5. The method of claim 3, wherein the MPC system is to optimize the sequence of motions over individual potential grasp options of the one or more potential grasp options.

6. The method of claim 1, further comprising:
modifying, based at least in part on one or more user inputs, the one or more motion constraints.

7. The method of claim 1, further comprising:
monitoring, during the individual time steps corresponding to the one or more motions of the sequence of motions, whether the end-effector contacts the human hand; and
upon a determination that the end-effector has contacted the human hand, performing one or more operations.

8. The method of claim 1, wherein individual motions of the sequence of motions are determined using one or more joint accelerations optimized for the individual time steps.

9. A method, comprising:
determining, during a sequence of time steps, a set of positions for a robot to perform an action;
determining, between a current position and a final position of the set of positions, a sequence of motions that satisfy one or more motion constraints, the sequence of motions allowing for a change in a target position from among the set of positions at individual time steps of the sequence of time steps;
causing, at individual time steps of the sequence of time steps, the robot to perform a respective motion of the sequence of motions in order to move at least a portion of the robot with respect to the target position; and
causing the robot to perform the action when at least the portion of the robot is determined to be within a threshold distance to the target position.

10. The method of claim 9, wherein one or more positions of the set of positions include location and orientation information.

11. The method of claim 9, wherein the sequence of motions is determined using a predictive model and one or more optimization criteria.

12. The method of claim 11, wherein the predictive model optimizes the sequence of motions over the set of positions and evaluates the target position at the individual time steps of the sequence of time steps.

13. The method of claim 9, wherein the one or more motion constraints include at least one of a constraint to favor smooth motion, a constraint to limit acceleration, a constraint to favor straight line motion, a constraint to avoid a collision, a constraint to avoid a self-collision, or a constraint to avoid an occlusion of a sensor.

14. The method of claim 9, further comprising:
capturing, during the sequence of time steps, sensor data representative of a physical environment in which the robot is to perform the action, and
determining the sequence of motions based at least in part on a change determined with respect to the physical environment.

15. A system, comprising:
one or more processing units to:
determine, during a sequence of time steps, a set of positions for a robot to perform an action;
determine, between a current position and a final position of the set of positions, a sequence of motions that satisfy one or more motion constraints, the sequence of motions allowing for a change in a target position from among the set of positions at individual time steps of the sequence of time steps;
cause, at individual time steps of the sequence of time steps, the robot to perform a respective motion of the sequence of motions in order to move at least a portion of the robot with respect to the target position; and
cause the robot to perform the action when at least the portion of the robot is determined to be within a threshold distance to the target position.

16. The system of claim 15, wherein the one or more processing units are further to:
use a predictive model to determine the sequence of motions based, at least in part, on one or more optimization criteria for the sequence of motions.

17. The system of claim 16, wherein the one or more processing units are further to:

optimize, using the predictive model, the sequence of motions over the set of positions and evaluate the target position at the individual time steps of the sequence of time steps.

18. The system of claim 15, wherein the one or more processing units are further to:

capture, during the sequence of time steps, sensor data representative of a physical environment in which the robot is to perform the action, and determine the change in target position based at least in part on a change determined with respect to the physical environment.

19. The system of claim 15, wherein the one or more motion constraints include at least one of a constraint to favor smooth motion, a constraint to limit acceleration, a constraint to favor straight line motion, a constraint to avoid a collision, a constraint to avoid a self-collision, or a constraint to avoid an occlusion of a sensor.

20. The system of claim 15, wherein the system comprises at least one of:

a control system for an autonomous or semi-autonomous machine;

a perception system for an autonomous or semi-autonomous machine;

a system for performing simulation operations;

a system for performing digital twin operations;

a system for performing light transport simulation;

a system for performing collaborative content creation for 3D assets;

a system for performing deep learning operations;

a system implemented using an edge device;

a system implemented using a robot;

a system for performing conversational AI operations;

a system for generating synthetic data;

a system incorporating one or more virtual machines (VMs);

a system implemented at least partially in a data center; or a system implemented at least partially using cloud computing resources.

* * * * *